(12) United States Patent
Lopez et al.

(10) Patent No.: US 9,686,406 B1
(45) Date of Patent: Jun. 20, 2017

(54) ISSUE DETECTION FOR ROUTING ASSISTANCE REQUESTS

(71) Applicant: Microsoft Technology Licensing, LLC, Redmond, WA (US)

(72) Inventors: Matt J. Lopez, Seattle, WA (US); Warren Johnson, Sammamish, WA (US); Paul Sanjeev Balarajan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/052,271

(22) Filed: Feb. 24, 2016

Related U.S. Application Data

(63) Continuation-in-part of application No. 14/995,596, filed on Jan. 14, 2016, and a continuation-in-part of application No. 14/965,537, filed on Dec. 10, 2015.

(51) Int. Cl.
*H04M 3/00* (2006.01)
*H04M 5/00* (2006.01)
*H04M 3/51* (2006.01)
*G06F 3/0484* (2013.01)

(52) U.S. Cl.
CPC ....... *H04M 3/5133* (2013.01); *H04M 3/5175* (2013.01); *G06F 3/04847* (2013.01)

(58) Field of Classification Search
CPC .............. H04M 3/5133; H04M 3/5175; G06F 3/04847
USPC .................. 379/265.12, 265.13, 266.01, 309
See application file for complete search history.

(56) References Cited

U.S. PATENT DOCUMENTS

| | | | |
|---|---|---|---|
| 5,206,903 A | 4/1993 | Kohler et al. | |
| 5,825,869 A | 10/1998 | Brooks et al. | |
| 6,021,403 A | 2/2000 | Horvitz et al. | |
| 6,131,122 A * | 10/2000 | Sampson | H04L 67/06 707/999.01 |
| 6,298,457 B1 | 10/2001 | Rachlin et al. | |
| 6,453,038 B1 | 9/2002 | McFarlane et al. | |
| 6,542,601 B1 | 4/2003 | Hernandez et al. | |
| 6,704,409 B1 | 3/2004 | Dilip et al. | |
| 6,742,141 B1 | 5/2004 | Miller | |
| 7,958,494 B2 | 6/2011 | Chaar et al. | |
| 8,001,527 B1 | 8/2011 | Qureshi et al. | |
| 8,588,395 B2 | 11/2013 | Hendricks et al. | |
| 8,589,323 B2 | 11/2013 | Keith, Jr. | |
| 8,638,925 B1 | 1/2014 | Billman | |

(Continued)

FOREIGN PATENT DOCUMENTS

WO 2015006308 A1 1/2015

OTHER PUBLICATIONS

"Onboarding API Guide—Java", Retrieved on: Feb. 17, 2016 Available at: https://allseenalliance.org/framework/documentation/develop/api-guide/onboarding/java.

(Continued)

*Primary Examiner* — Quynh Nguyen
(74) *Attorney, Agent, or Firm* — Christopher J. Volkmann; Kelly, Holt & Christenson, PLLC

(57) ABSTRACT

An issue is identified based on corresponding information indicative of steps taken in an on-boarding process and a velocity of transition through the steps. The issue is matched against an agent based on agent capabilities exposed by the agent. The issue and corresponding information are routed to the agent.

20 Claims, 24 Drawing Sheets

(56) References Cited

U.S. PATENT DOCUMENTS

| | | | |
|---|---|---|---|
| 8,718,272 B2 | 5/2014 | Desai et al. | |
| 8,737,598 B2 | 5/2014 | Bruce et al. | |
| 8,793,359 B1 | 7/2014 | Fiebig et al. | |
| 8,837,704 B2 | 9/2014 | Ramanathan et al. | |
| 8,837,711 B2 | 9/2014 | Vasquez et al. | |
| 8,874,636 B2 | 10/2014 | Tuchman et al. | |
| 8,965,957 B2 | 2/2015 | Barros | |
| 9,026,851 B2 | 5/2015 | Mondal et al. | |
| 2006/0062374 A1 | 3/2006 | Gupta | |
| 2009/0119147 A1 | 5/2009 | Messer | |
| 2009/0181665 A1 | 7/2009 | Sater et al. | |
| 2011/0225636 A1 | 9/2011 | Keith et al. | |
| 2012/0054731 A1 | 3/2012 | Aravamudan et al. | |
| 2012/0076283 A1 | 3/2012 | Ajmera et al. | |
| 2012/0101865 A1 | 4/2012 | Zhakov | |
| 2013/0046571 A1 | 2/2013 | Tuchman et al. | |
| 2013/0103749 A1 | 4/2013 | Werth et al. | |
| 2013/0173479 A1 | 7/2013 | Paz Salgado et al. | |
| 2014/0006292 A1 | 1/2014 | Kozlovsky et al. | |
| 2014/0108073 A1 | 4/2014 | Castel et al. | |
| 2014/0236934 A1 | 8/2014 | Boyle et al. | |
| 2014/0245141 A1 | 8/2014 | Yeh et al. | |
| 2014/0278785 A1 | 9/2014 | Gaedcke et al. | |
| 2014/0279718 A1 | 9/2014 | Southey et al. | |
| 2014/0324647 A1 | 10/2014 | Iyoob et al. | |
| 2014/0336795 A1 | 11/2014 | Asenjo et al. | |
| 2015/0135013 A1 | 5/2015 | Thomas et al. | |
| 2015/0147999 A1 | 5/2015 | Venezia et al. | |
| 2015/0195407 A1 | 7/2015 | Kaufman | |
| 2016/0267551 A1* | 9/2016 | Zheng | G06Q 30/0277 |

OTHER PUBLICATIONS

"Oracle TBE Onboarding Cloud Service", Retrieved on: Feb. 17, 2016 Available at: http://www.oracle.com/us/media1/tbe-onboarding-cloud-service-1676869.pdf.

"Axway API Gateway", Published on: Apr. 21, 2015, Available at: https://www.axway.com/sites/default/files/datasheet_files/axway_datasheet_api-gateway_en.pdf.

"Microsoft FastTrack: getting your customers to the cloud", Retrieved on: Feb. 17, 2016 Available at: https://partner.microsoft.com/en-US/Solutions/fasttrack.

Danielson, Steve, "What is Azure API Management?", Published on: Sep. 21, 2015 Available at: https://azure.microsoft.com/en-in/documentation/articles/api-management-get-started/.

Application and Drawing for U.S. Appl. No. 15/099,724, filed Apr. 15, 2016, 76 pages.

Non-Final Office Action for U.S. Appl. No. 14/995,596, dated Sep. 15, 2016, 11 pages.

U.S. Appl. No. 14/995,596, filed Jan. 14, 2016 Application and drawings. 64 pages.

Verint, Retrieved on: Jul. 28, 2015 Available at: http://www.verint.com/solutions/customer-engagement-optimization/voice-of-the-customer-analytics/products/text-analytics/.

"Eptica enables businesses to increase revenue from customer service with new Multichannel Customer Interaction Suite", Published on: Apr. 9, 2013 Available at: http://www.eptica.com/eptica-enables-businesses-increase-revenue-customer-service-new-multichannel-customer-interaction.

"Interaction Analytics?", Retrieved on: Jul. 28, 2015 Available at: http://www.nice.com/engage/workforce-optimization/interaction-analytics.

"Avaya Aura Contact Center Software Review", Published on: Jan. 9, 2012 Available at: http://www.crmsearch.com/avaya-contact-center-capabilities.php.

"Contact center", Published on Jul. 16, 2012 Available at: https://msdn.microsoft.com/en-us/library/office/dn465935.aspx.

U.S. Appl. No. 14/965,537, filed Dec. 10, 2015 Application and drawings. 49 pages.

"Inbound Automatic Call Distribution (ACD) Systems", Retrieved on: Jul. 27, 2015 Available at: http://www.aspect.com/in/solutions/customer-experience/inbound-automatic-call-distribution-acd systems.

Cyriac, Francis, "Ameyo Callversations", Published on: Jan. 29, 2015 Available at: http://www.ameyo.com/blog/ameyo-call-center-integration-with-freshdesk.

"Microsoft FastTrack: getting your customers to the cloud", Retrieved on: Jul. 31, 2015 Available at: https://mspartner.microsoft.com/en/us/Pages/Solutions/fasttrack.aspx#overview.

"TAG Solutions Managed Services Onboarding Process Outline", Retrieved on: Jul. 31, 2015 Available at: http://tagsolutions.com/managed-services/customer-onboarding-outline/.

"Mailbox Migration to Exchange Online" Published on: Jun. 20, 2015 Available at: https://technet.microsoft.com/en-us/library/jj863291(v=exchg.150),aspx.

"Inbound Automatic Call Distribution (ACD) Systems", Retrieved on Jul. 27, 2015 Available at: http://www.aspect.com/in/solutions/customer-experience/inbound-automatic-call-distribution-acd-systems.

Cyriac, Francis, "Ameyo Callversations" Published on: Jan. 29, 2015 Available at: http://www.ameyo.com/blog/ameyo-call-center-integration-with-freshdesk.

U.S. Appl. No. 14/995,596, filed Jan. 14, 2016 and drawings. 64 pages.

Amendment for U.S. Appl. No. 14/995,596 dated Nov. 29, 2016, 13 pages.

Notice of Allowance for U.S. Appl. No. 14/995,596 dated Jan. 25, 2017, 10 pages.

Amendment After Notice of Allowance for U.S. Appl. No. 14/995,596 dated Feb. 7, 2017, 8 pages.

International Search Report and Written Opinion for International Patent Application No. PCT/US2016/063735, date of mailing: Feb. 7, 2017, date of filing: Nov. 25, 2016, 11 pages.

International Search Report and Written Opinion for International Patent Application No. PCT/US2017/012659, date of mailing: Feb. 23, 2017, date of filing: Jan. 9, 2017, 12 pages.

* cited by examiner

Run state assets feedback

350 →

Ravi, please rate our service

Need Help?

We're constantly trying to improve the quality of assistance we provide. Your feedback is appreciated.

352 → Did we solve your issue today?
⦿ Yes ○ No

354 → How would you rate our support?
★★★★ ☆

356 → How would you rate your overall experience with ACME services?
★★★★ ☆

358 → Any additional comments or feedback?
Add a little detail for us to review. We're here to help!

360 → Send

☐ I'm willing to answer more questions

FIG. 6C

ISSUE DETECTION FOR ROUTING ASSISTANCE REQUESTS

The present application is a continuation-in-part of and claims priority of U.S. patent application Ser. No. 14/995,596, filed Jan. 14, 2016, and is also a continuation-in-part of the and claims priority of U.S. patent application Ser. No. 14/965,537, filed Dec. 10, 2015, content of which is hereby incorporated by reference in its entirety.

BACKGROUND

Computer systems are currently in wide use. Some computer systems host multi-tenant systems for organizations. Each tenant corresponds to a different organization, and each organization may have a number of different users, each of whom use a client device.

Such multi-tenant systems often allow tenants, or even individual users, to add services that are hosted by the multi-tenant computing system. The process by which a user or tenant adds a service is sometimes referred to as on-boarding. It can be difficult for a user or tenant to add a service. The on-boarding process by which a service is added, or by which a tenant or user registers for a service, can be cumbersome and technically complicated. In addition, even after a service is successfully added, some tenants find it difficult to have their users engage with a new service, and actually use it, successfully.

In order to address these types of problems, some companies provide technical support services. To take advantage of such services, a user often needs to call, by telephone, or to contact the technical support personnel using some type of electronic messaging. When a technical support request is received, it is often routed to an individual technician or agent who may be able to help with the problem. However, the problems are often incorrectly, or incompletely, identified, at the beginning. Therefore, the user who is requesting technical support may be routed to one department or individual technician, who is not suited to address the problem. Therefore, the user is re-routed to another department or technician, and this process can be repeated. This can lead to a high level of dissatisfaction among users of the multi-tenant services.

The discussion above is merely provided for general background information and is not intended to be used as an aid in determining the scope of the claimed subject matter.

SUMMARY

An issue is identified based on corresponding information indicative of steps taken in an on-boarding process and a velocity of transition through the steps. The issue is matched against an agent based on agent capabilities exposed by the agent. The issue and corresponding information are routed to the agent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6A-6C show examples of user interface displays.

DETAILED DESCRIPTION

Figure 1:
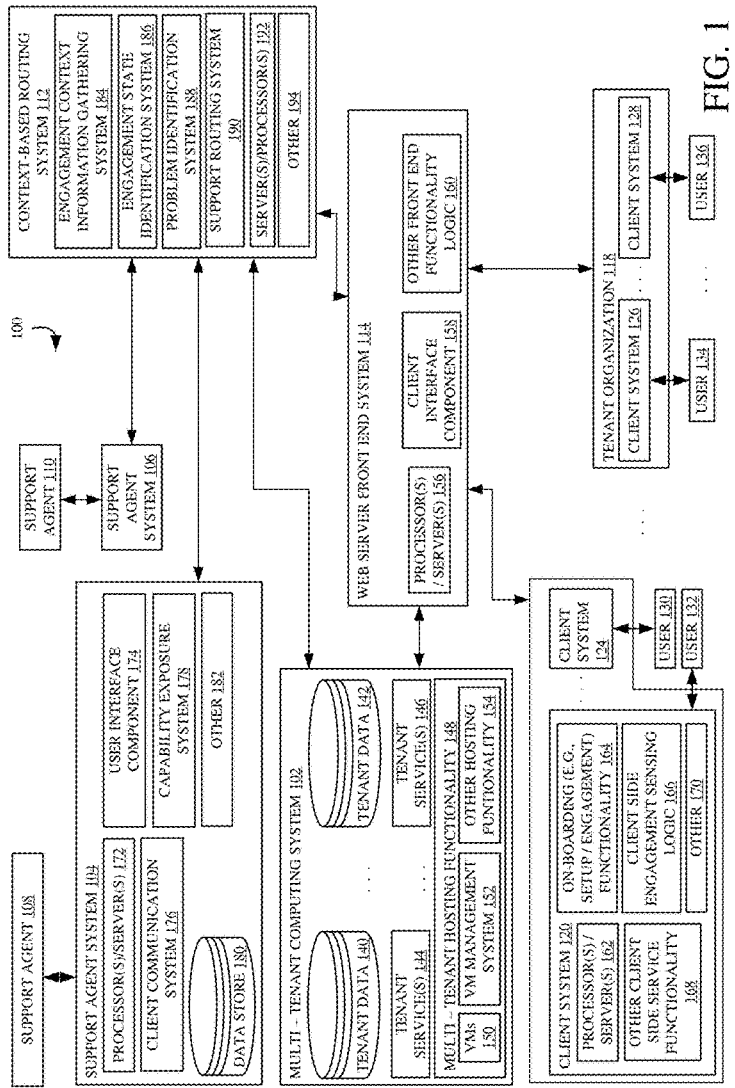
FIG. 1 is a block diagram of one example a multi-tenant computing system architecture.

FIG. 1 is a block diagram of one example of a multi-tenant computing system architecture 100. Architecture 100 illustratively includes multi-tenant computing system 102, one or more support agent systems 104-106, each of which can be used by one or more support agents 108-110. Architecture 100 also illustratively includes context-based routing system 112, web server front end system 114, and one or more tenant organizations 116-118 that interact with multi-tenant computing system 102 through web server front end system 114.

Each tenant organization 116-118 can include a plurality of client systems 120-128, and can be used by a plurality of users 130-136 in order to use server-side services in multi-tenant computing system 102. Each tenant organization may be a separate organization that accesses multi-tenant computing system 102 for hosted services, data, applications, etc. Users 130-136 each illustratively interact with one or more client systems 120-128 in order to control and manipulate not only the corresponding client systems, but multi-tenant computing system 102, as well.

Each of the client systems 120-128 can include one or more servers or processors 162, on-boarding (e.g., setup/engagement) functionality 164, engagement sensing logic 166, a wide variety of other client side service functionality 168, and it can include other items 170. Multi-tenant computing system 102 illustratively includes one or more sets of tenant data 140-142, and one or more sets of tenant services 144-146. It also illustratively includes multi-tenant hosting functionality 148 which, itself, can include one or more virtual machines 150, virtual machine management system 152, and a wide variety of other multi-tenant hosting functionality 154. Web server front end system 114 illustratively includes one or more servers or processors 156, client interface component 158, and it can include a wide variety of other front end functionality logic 160.

Support agents 108-110 illustratively interact with support agent systems 104-106 in order to provide support to users 130-136 (or tenants 116-118) when needed. Each support agent system 104 can include one or more processors or servers 172, user interface component 174, client communication system 176, capability exposure system 178, data store 180, and it can include a wide variety of other items 182.

Users 130-136 illustratively interact with on-boarding (e.g., setup and engagement) functionality 164 in order to subscribe to (or setup) a client configuration to use multi-tenant services 144-146 or data. Engagement sensing logic 166 illustratively senses various metrics, values, inputs, and/or other information that is indicative of the state of readiness (e.g., the state of the setup of a tenant) as well as the state of engagement (e.g., the state of whether any users are successfully using the multi-tenant services, how many users are using the multi-tenant services, and at what level of usage—e.g., the level of sophistication of the usage, the volume or frequency of usage, etc.) and provides that information through web server front end system 114 to context-based routing system 112. Users 130-136 also illustratively use other client side service functionality 168 in order to engage with, and use, the multi-tenant services hosted by system 162.

Client interface component 158 in web server front end system 114 illustratively generates client interface data that can be used by the various client systems. The client interfaces can include user input mechanisms that can be actuated by users 130-136 in order to control and manipulate multi-tenant computing system 102.

Virtual machine management system 152 (which can include a hypervisor and/or other items) illustratively manages the creation, operation, and deletion, of various virtual machines 150. Multi-tenant hosting functionality 148 also illustratively provides the functionality that is used in order to host the multi-tenant services or data that is accessed by the various tenant organizations 116-118.

Tenant services 144-146 can be any of a wide variety of multi-tenant services that are hosted by system 102. The tenant data 140-142 illustratively corresponds to the individual tenants or tenant organizations 116-118. Therefore, the tenant services 144-146 can operate on the tenant data 140-142, and can provide other services as well.

It may be that, at some point, one of the users 130-136 (or one of the tenants or tenant organizations 116-118) encounters an issue. An issue, in this context, can be a problem encountered in the on-boarding process (such as in configuring a tenant service that the tenant has just subscribed to, or in engaging with that service, and using it). In that case, support agents 108-110 may interact with users 130-136 in order to address the issues. In doing so, context-based routing system 112 illustratively identifies context information for the tenant organization (and user) that is having the issue, and identifies a stage or steps in the on-boarding process (or a state of readiness and engagement) of that tenant (or user, or both) with respect to the service and a velocity with which the tenant or user is moving through the on-boarding process. It then identifies a support agent 108-110, based upon exposed capabilities that are exposed by agents 108-110 through capability exposure system 178. The client communication system in the corresponding support agent system is then used to communicate with a user of the given tenant, in order to address the issue.

As briefly mentioned above, context-based routing system 112 illustratively identifies context information regarding a tenant or tenant service, or even an individual user, that is having an issue. The context information is illustratively a stage or step that the tenant/user is on in the on-boarding process and a velocity indicator that indicates how quickly the tenant/user is progressing through that process. It then identifies a particular support agent, based on the capabilities exposed by the agent, that can provide support to that user or tenant based on the contact information. Context-based routing system 112 thus includes engagement context information gathering system 184, engagement state identification system 186, problem identification system 188, support routing system 190, one or more processors or servers 192, and it can include a wide variety of other items 194.

Engagement context information gathering system 184 illustratively gathers not only server side context information indicative of the readiness and engagement of a given tenant, but it can also communicate with engagement sensing logic 166 in order to gather client side readiness and engagement information (such as the on-boarding stage or step and the velocity indicator). Based on that information, engagement state identification system 186 identifies a readiness state and an engagement state of the particular tenant for which the information was gathered.

Problem identification system 188 identifies problems in on-boarding or configuring a service, or in running a service, based upon the context information and based upon the engagement state. Support routing system 190 then routes the user (or tenant) having the issue to a given support agent 108-110. In doing so, it accesses capabilities exposed by the support agents 108-110 through capability exposure system 178. It matches the issue against the capabilities of the support agent, and then routes communication from the user (or tenant) with the issue to the identified support agent so that the user can obtain support from a qualified support agent. The capability exposure system 178 and support routing system 190 are described in greater detail below with respect to FIGS. 4A-4F.

Figure 2:
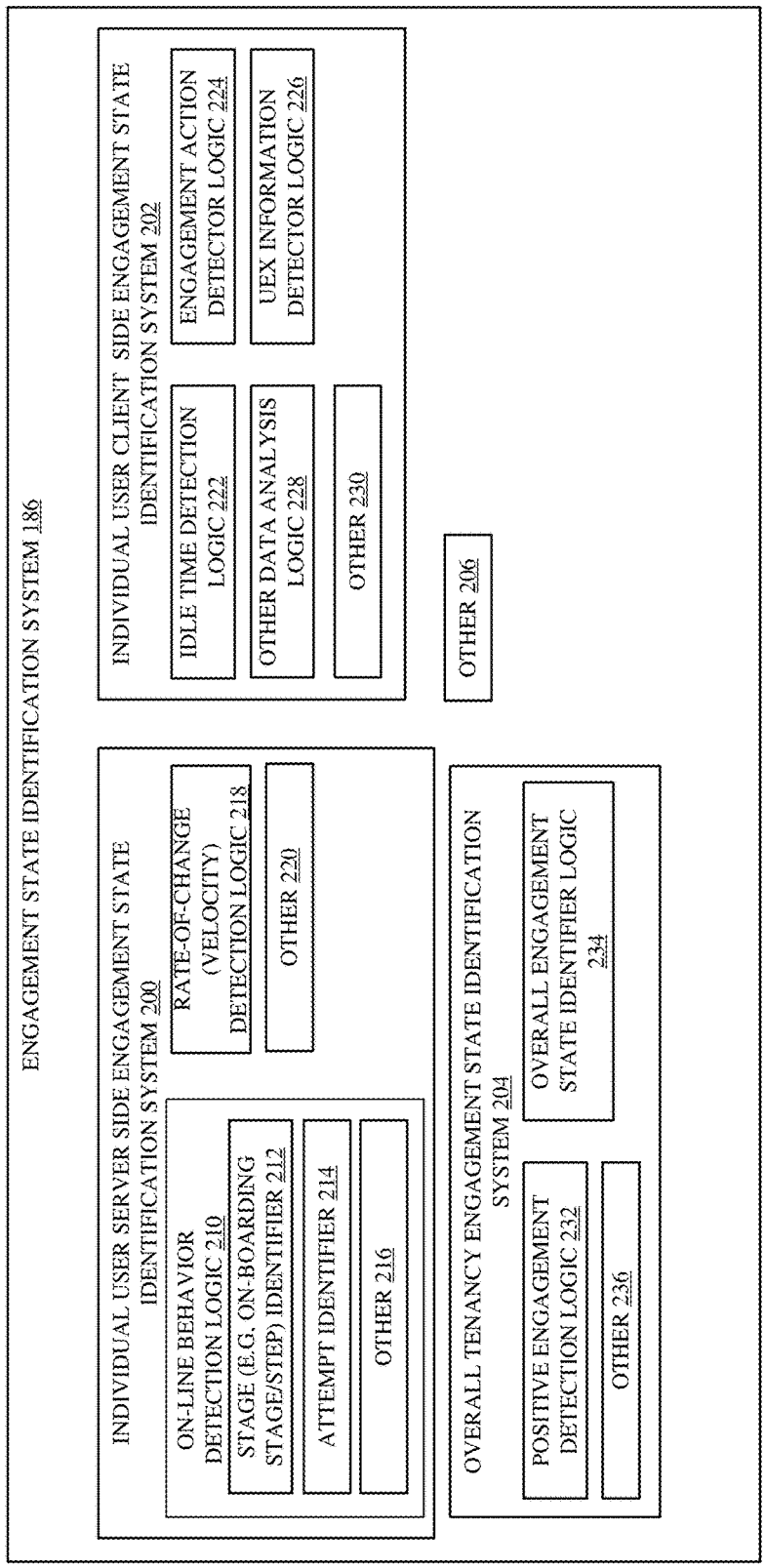
FIG. 2 is a more detailed block diagram of one example of an engagement state identification system.

Before describing the overall operation of architecture 100 in more detail, a brief description of some of the items shown in FIG. 1, and their corresponding operation, will first be provided. FIG. 2 shows a more detailed example of an engagement state identification system 186. System 186 illustratively includes an individual user, server side engagement state identification system 200, an individual user, client side engagement state identification system 202, and an overall tenancy engagement state identification system 204. It can include a wide variety of other items 206 as well.

The individual user, server side engagement state identification system 200 illustratively includes on-line behavior detection logic 210 which, itself, illustratively includes stage (e.g., on-boarding stage/step) identifier logic 212, attempt identifier logic 214, and it can include a wide variety of other items 216. System 200 also illustratively includes rate-of-change (e.g., velocity) detection logic 218 and it can include other items 220. Individual user, client side engagement state identification system 202 illustratively includes idle time detection logic 222, engagement action detector logic 224, user experience (UEX) information detector logic 226, other data analysis logic 228, and it can include other items 230. Overall tenancy engagement state identification system 204 illustratively includes positive engagement detection logic 232, overall engagement state identifier logic 234, and it can include other items 236.

Individual user, server side engagement state identification system 200 illustratively senses or detects various information indicative of server side activity of one or more individual users of a tenant. It then identifies a state of engagement and/or readiness (e.g., the on-boarding stage/step) of that individual user (or of that set of individual users). On-line behavior detection logic 210 detects the on-line behavior of the user in performing the on-boarding process. For instance, it may be that a user needs to perform a variety of different steps or tasks, in one or more stages, in order to have an on-line service fully setup and configured for use. By way of example, it may be that a tenant needs to go through a set of setup or configuration steps, such as establishing an entity record in the service, downloading and installing client components of the service, setting up domain name information, connecting the on-line service to the client components, and performing some type of data migration (such as migrating contacts, etc.), and then using the service. Each of these stages or steps may include a plurality of different steps or tasks as well. Attempt identifier 214 illustratively identifies attempts by a user to perform the steps or tasks for each of the stages or steps. It also illustratively identifies when a stage or step has been completed. Stage identifier 212 illustratively identifies the last stage or step that was completed by the user in attempting to perform the on-boarding process for the on-line service. Rate-of-change detection logic 218 detects how quickly the tenant is moving through the various stages or steps to become fully setup. By way of example, if the user performs all of the steps for the stage in setting up domain name information, but then takes an inordinately long amount of time to perform tasks in the stage (connecting the client components to the on-line service), stage identifier 212 will identify that the tenant has completed the first stage, but not the second stage. Attempt identifier 214 detects how many attempts the user has made to complete the second stage, and rate-of-change logic 218 will detect the velocity with which the user is moving through the stages or steps and generate a velocity indicator indicative of that. In this example, the velocity indicator will show that the user appears to be stuck on the second stage, because the last stage completed by the user has not changed in an unusually long time. The time can be measured against a threshold time value (or set of threshold values) for each stage or step, for different groups of stages or steps, for the on-boarding process as a whole, or it can be determined in other ways.

Individual user client side engagement stage identification system 202 illustratively performs the same types of analysis, except with respect to the user's activity on the client side, instead of on the server side. By way of example, the engagement sensing logic 166 on the client side (shown in FIG. 1) may provide information that can be operated on or analyzed by system 202 to help identify the current on-boarding stage or step, or the current state of readiness or engagement of the tenant. By way of example, assume that a setup wizard is provided to guide the user through the various stages in the on-boarding process, needed to setup the on-line service. Idle time detection logic 222 may detect how long it has been since the user attempted to setup (or complete setting up) the on-line service. UEX information detector logic 226 may illustratively detect whether the user has launched the setup wizard, whether the user has launched it multiple times, without finishing the setup, how far the user has made it through the setup wizard, etc. All of this and other information can be used to identify the on-boarding stage or step, or the stage of the engagement or readiness of the individual user, based upon the client side activity of that user.

Similarly, engagement action detector logic 224 illustratively detects engagement actions that are performed by the user. For instance, if the user is setting up an electronic mail (e-mail) service, and the user has attempted to send an e-mail, or receive and read an e-mail, etc., these actions can be detected by logic 224. All of this information can also be used, along with the information sensed by system 200, to identify an engagement stage of the tenant, and of individual users of the tenant.

Overall tenancy engagement state identification system 204 can use the information from systems 200 and 202, and other information, to determine an overall engagement state of a particular tenant. For instance, if no users at the tenant have ever used the service, then the engagement state may be "unengaged". If a single user has used the service, then the engagement state may be set to a first level, indicating that the tenant has successfully setup with the service, and at least one person has successfully used it. Other thresholds can be set for different percentages of the overall users at the tenant that are using the service. When the number of users using the service reaches those different thresholds, then the engagement state of the tenant can be increased to reflect that more individual users at the tenant are actually and positively engaged with the service.

In order to do so, positive engagement detection logic 232 can detect a number of individual users at a tenant (if any) that have had a positive engagement with the service. By positive engagement it is meant that the user has successfully used some aspect of the service. By way of example, if the service is an e-mail service, a positive engagement would be that a user has successfully sent or received an e-mail. Overall engagement state identifier logic 234 identifies the overall engagement state of the tenant, based upon the users who have had a positive engagement with the service.

It can set the overall engagement state of the tenant by comparing the number of users (or percent of the users or other measure of the users) of a tenant that have had a positive engagement against threshold values. It can also set the engagement state based upon the complexity of the engagement operations that have been performed by a user. By way of the above example, where the service is an e-mail service, if a user has sent an e-mail, that may correspond to a first engagement state. However, if the user has created multiple folders in the e-mail system, or successfully attached an attachment to an e-mail, or performed other actions, those actions are more complex, and may thus correspond to one or more different engagement states. All of these and other options are contemplated herein.

Figure 3:
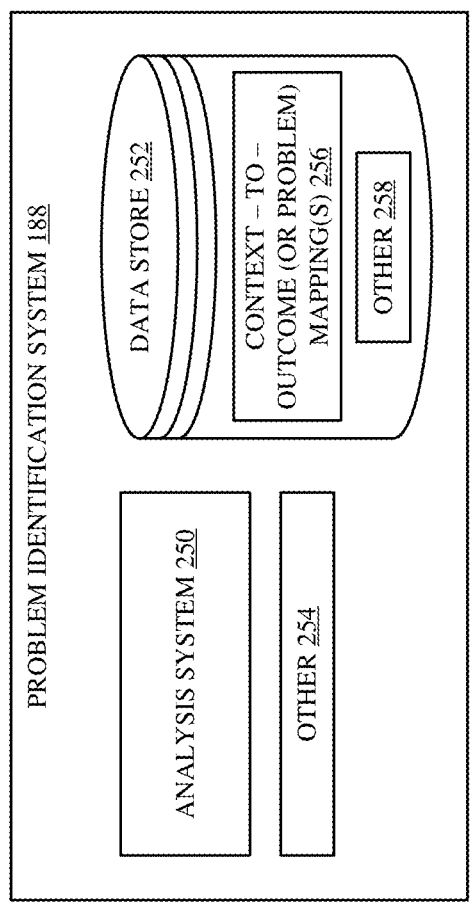
FIG. 3 is a more detailed block diagram of one example of a problem identification system.

FIG. 3 is a block diagram showing one example of problem identification system 188 (shown in FIG. 1) in more detail. In one example, problem identification system 188 includes analysis system 250 that analyzes the on-boarding stage or step, the velocity indicator, and any identified engagement stage and context information. System 188 also includes data store 252, and it can include a wide variety of other items 254. Data store 252 illustratively includes context-to-outcome (or problem) mappings 256. Mappings 256 illustratively map the context information of a particular tenant (e.g., the stage or step identifier and the velocity indicator and/or other information) to a likely problem that the tenant is having or a likely outcome as to whether the tenant will successfully complete the on-boarding process and setup and engage with a service. In one example, mappings 256 are generated based on historical information collected from a plurality of other tenants, and users.

Analysis system 250 illustratively receives the various context information gathered by engagement context information gathering system 184 and also receives the various on-boarding stage or step and velocity information, and engagement state information identified by engagement state identification system 186 and generates a set of overall context information. It then accesses data store 252 and correlates that overall context information to a likely outcome for the corresponding tenant, or to a likely problem that the corresponding tenant is having. System 188 can then output this information to support routing system 190 (shown in FIG. 1) that can route a user of the corresponding tenant to a particular support agent 108-110 based upon the capabilities exposed by support agents 108-110.

Therefore, in one example, support routing system 190 can route the tenant to a support agent that is capable of addressing the issues or problems encountered by that tenant, in completing the on-boarding process quickly and without transferring the tenant to a different support agent. This is because the support agent will be pre-qualified to handle the particular issue encountered by the tenant, based upon the capabilities that they have exposed through capability exposure system 178. System 112, having identified the likely issues or problems being encountered by the tenant, can then identify a support agent that is suitable to address those issues or problems.

Figure 4:
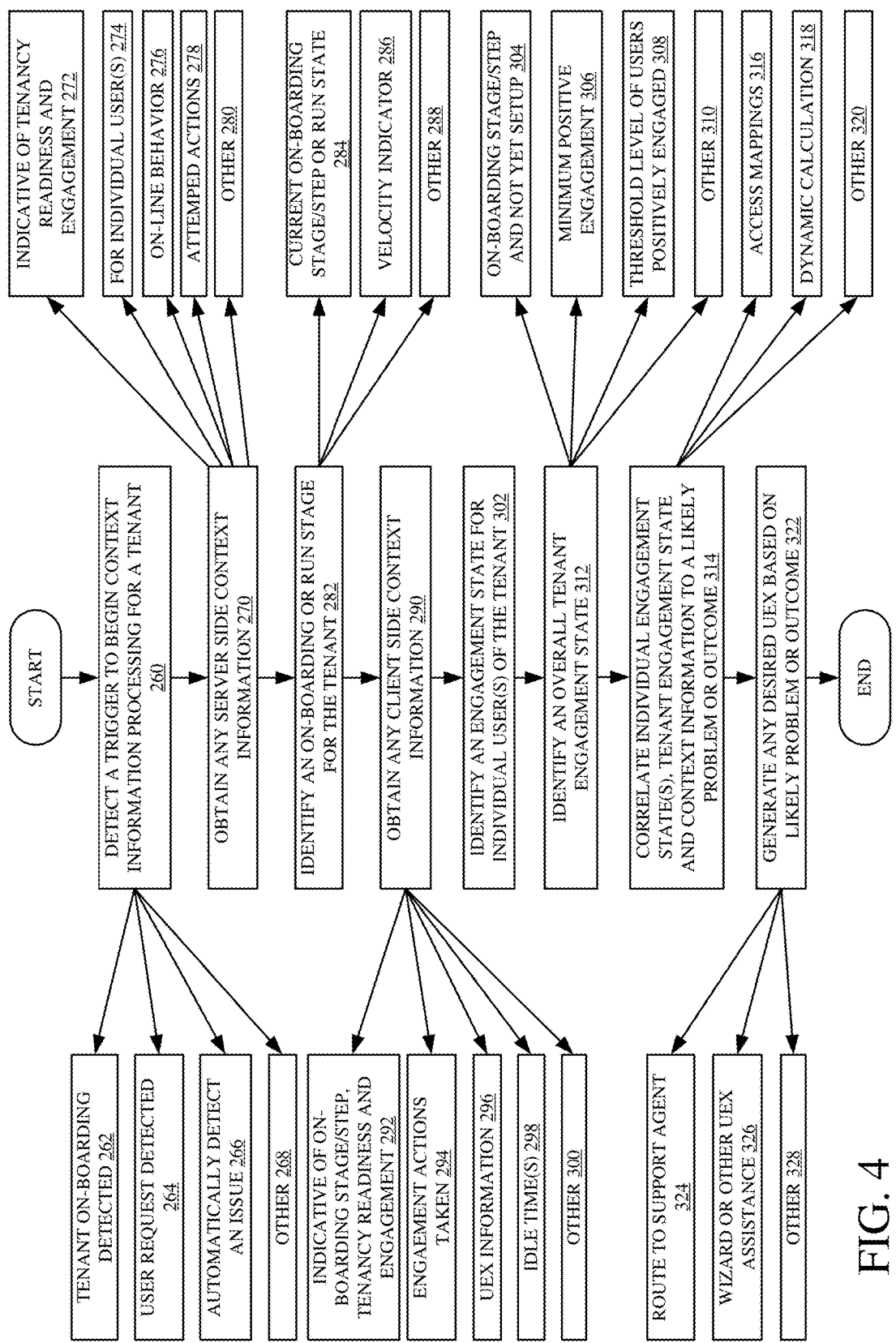
FIG. 4 is a flow diagram illustrating one example of the operation of the architecture shown in FIG. 1, in identifying an engagement state of a tenant in a multi-tenant architecture.

FIG. 4 is a flow diagram illustrating one example of the operation of the architecture shown in FIG. 1, in identifying on-boarding stage/step, velocity and context information and an engagement state of a tenant, correlating that to a likely problem or outcome for the tenant, and then performing any user experience (UEX) operations based upon the estimated outcome or problems. Context-based routing system 112 first detects a trigger indicating that it should begin context information processing for a tenant. This is indicated by block 260 in FIG. 4. There are a wide variety of different types of triggers that can be used to begin this processing. For instance, it may be that system 112 detects that a tenant has purchased a subscription for an on-line service and is attempting the on-boarding process to configure this service for use. This is indicated by block 262. It may be that a user at a tenant is requesting help or assistance in addressing an issue. This is indicated by block 264. It may be that system 112 automatically detects that a user or tenant is encountering an issue or problem in either setting up a service or in using it. This is indicated by block 266. The triggers can be a wide variety of other triggers as well, and this is indicated by block 268.

Once it has been triggered, engagement context information gathering system 184 (or system 200 shown in FIG. 2) obtains any server side context information that may exist for the tenant. This is indicated by block 270. For instance, it may be context information, as discussed above, that is indicative of the tenancy readiness and engagement with a service that the tenant is attempting to setup and use. This is indicated by block 272. It may be context information for one or more individual users of a tenant, as indicated by block 274. It may be information indicative of on-line behavior of the users or of the tenant as a whole, as indicated by block 276. The context information may identify attempted actions, that one or more users of the tenant has attempted to perform in order to setup or positively engage with the service. This is indicated by block 278. It may include a wide variety of other server side context information as well, and this is indicated by block 280.

System 184 then identifies an onboarding or run stage or step for the tenant. This is indicated by block 282. For instance, this can include a current stage or step the tenant is on in the on-boarding process or the run state of the tenant as indicated by block 284. It can also include a velocity indicator indicative of a rate-of-change of the stages, steps or states that the tenant is going through. This is indicated by block 286. It can also include a wide variety of other information, as indicated by block 288.

System 184 (or system 202 shown in FIG. 2) then obtains any client side stage, step, or other context information. This is indicated by block 290. This can be information indicative of the tenancy on-boarding stage or step, the tenancy readiness and engagement with the service, as indicated by block 292. It can include an identification of any engagement actions that have been taken as indicated by block 294. It can include user experience (UEX) information 296, such as information indicating whether the user has successfully advanced through a setup wizard or other user experiences that may give an indication of readiness or engagement. The context information can include idle times 298 that indicate how long a user has been on a page of a multi-step wizard, how long the user has been at a certain stage or step in the on-boarding or setup process, etc. The client side context information can include a wide variety of other information 300 as well.

Engagement state identification system 186 then identifies an engagement state for one or more individual users of the tenant, based on the context information. This is indicated by block 302. The state may indicate where the user is in the on-boarding process, and that the service is not setup yet, as indicated by block 304. It may be a state of minimum positive engagement, such as when a single user or small group of users at the tenant has successfully used the service. This is indicated by block 306. It may be a higher state of engagement where the positive engagements by the users of the tenant exceed various different thresholds. This is indicated by block 308. The state of engagement of the individual users can be identified in other ways as well, and this is indicated by block 310.

Based upon the on-boarding and velocity information, the context information and engagement states of individual users of the tenant, overall tenancy engagement state identification system 204 then identifies an overall tenant engagement state for the tenant. Of course, this can be done based on other context information as well. This is indicated by block 312.

Analysis system 250 (in problem identification system 188 in FIG. 3) then correlates the individual user engagement states, the overall tenant engagement state, and the other on-boarding, velocity and context information, to a likely problem that is being encountered by the tenant. This is indicated by block 314. In doing so, system 250 can access the context-to-outcome (or problem) mappings 256. This is indicated by block 316. The correlation can also be based upon a dynamic calculation, instead of predefined mappings. This is indicated by block 318. The correlation can be performed in other ways as well, and this is indicated by block 320.

Once the engagement state (e.g., the on-boarding stage/step or runtime state) is known, and once any issues or problems are identified, system 112 can perform any desired processing actions, or conduct any desired user experience (UEX). This is indicated by block 322. For instance, support routing system 190 can route the tenant to a support agent 108-110. This is indicated by block 324. System 112 can also surface a wizard or other UEX for a user of the tenant that can guide the user to address any identified issues or problems. This is indicated by block 326. A wide variety of other processing can be performed as well, based upon the state of engagement and any likely problems or outcomes, once they have been identified. This is indicated by block 328.

Figure 4A:
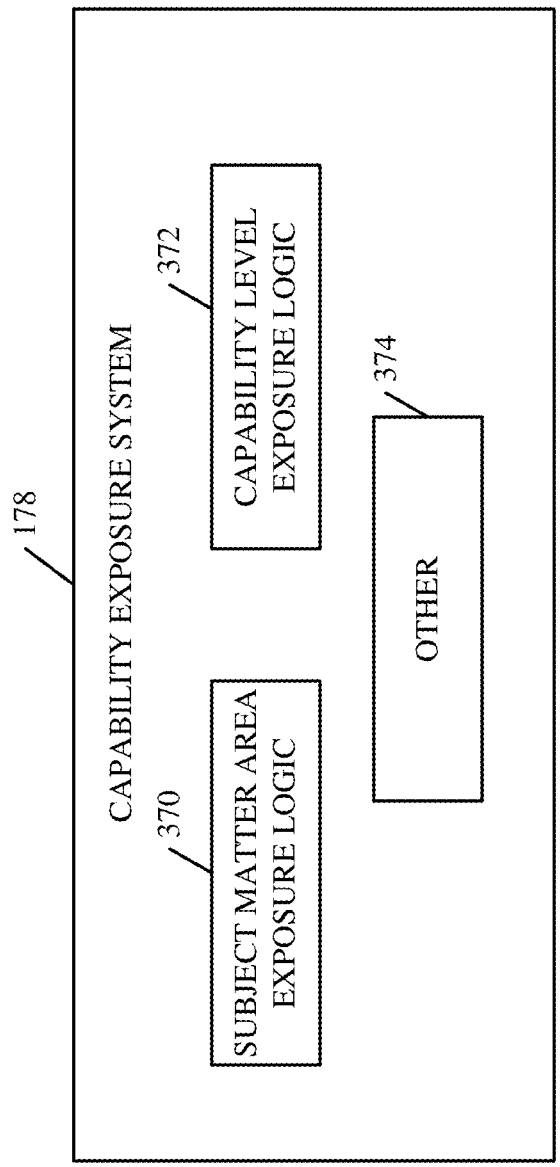
FIG. 4A is a block diagram of one example of a capability exposure system.
Figure 4B:
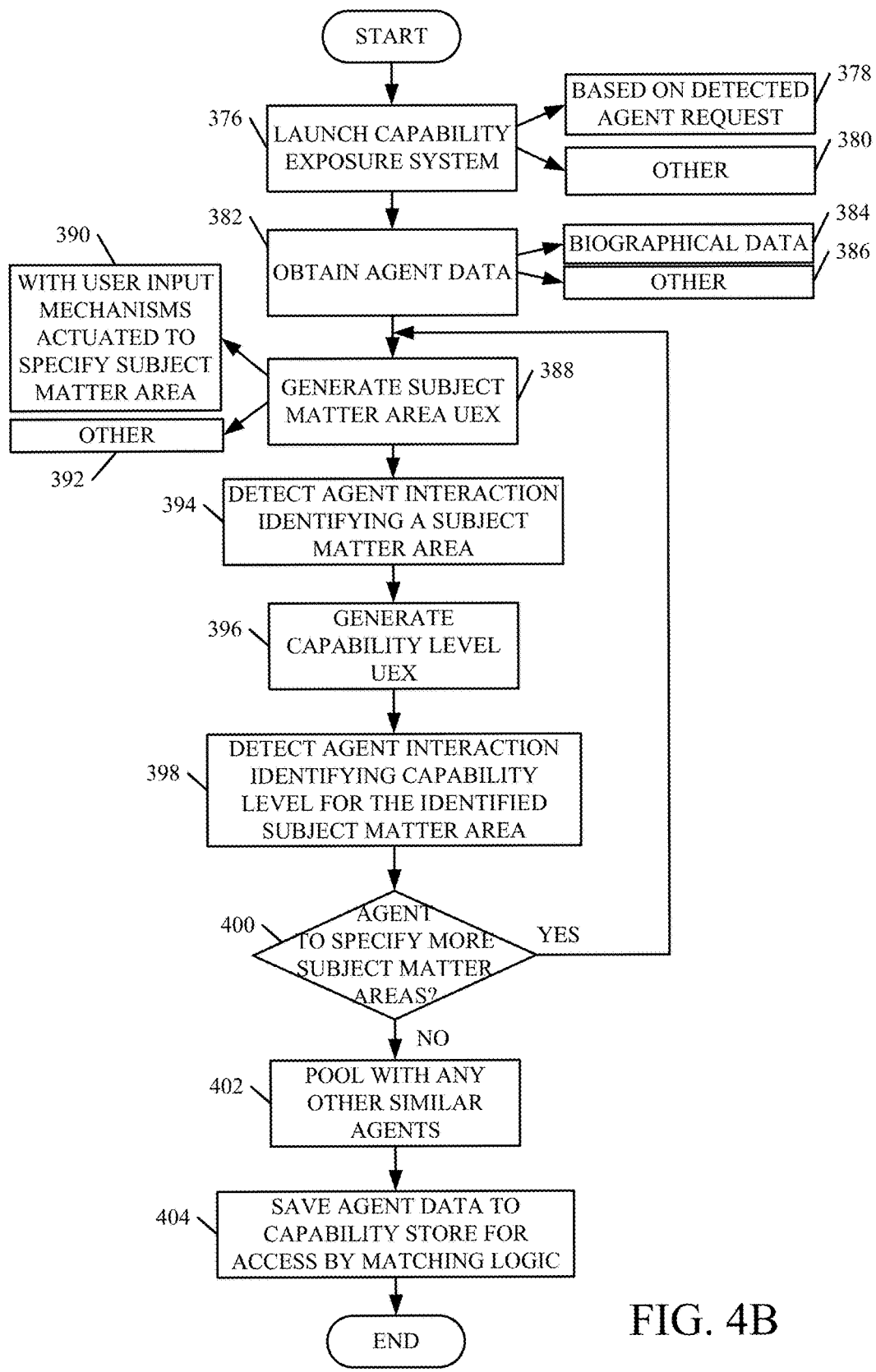
FIG. 4B is a flow diagram illustrating one example of the operation of the capability exposure system.

FIG. 4A shows one example of a more detailed block diagram of capability exposure system 178. System 178 illustratively includes subject matter area exposure logic 370, capability level exposure logic 372 and it can include other items 374. Subject matter area exposure logic 370 illustratively generates a user experience (which can include user interfaces and corresponding functionality) that allow an agent to enter his or her capabilities in various different subject matter areas. Capability level exposure logic 372 illustratively generates a user experience that allows the agent to enter his or her capability level with respect to the different subject matter areas identified using logic 370. FIG. 4B is a flow diagram illustrating one example of the operation of capability exposure system 178 in more detail.

In one example, a support agent (the description will proceed with respect to support agent 108 using system 104) launches capability exposure system 178 so that he or she can enter different capabilities to be exposed by support agent system 104 to context-based routing system 112. Launching the capability exposure system 178 is indicated by block 376 in FIG. 4B. The agent can do this by providing an express request as indicated by block 378, or in other ways, as indicated by block 380.

System 178 then obtains some basic agent data that may have already been entered by agent 108. In another example, system 178 prompts the agent 108 to enter that data. This is indicated by block 382. The agent data can include biographical data 384 (which may be obtained, for instance, from a profile or other place), and it can include a wide variety of other information 386.

Subject matter area exposure logic 370 then generates a subject matter area user experience (or UEX). This is indicated by block 388. The UEX can include user interfaces that have user input mechanisms that can be actuated to specify one or more different subject matter areas. This is indicated by block 390. For instance, it may be that the subject matter area UEX generates a user interface display with a drop down menu that displays various selectable subject matter areas. In another example, the user input mechanisms can include devices for browsing and selecting different subject matter areas, or for entering customized subject matter areas. All of these and other architectures are contemplated herein. The subject matter area UEX can include other items 392 as well.

Logic 370 then detects agent interaction with the elements of the UEX, which identify a particular subject matter area. This is indicated by block 394.

Once a subject matter area has been identified by the agent, then capability level exposure logic 372 generates a capability level user experience. This is indicated by block 396. Again, the capability level UEX can have user interface displays with user input mechanisms that allow the agent to select, describe, or otherwise identify his or her particular capabilities in the selected subject matter area. The capabilities can be identified in a wide variety of different ways as well. For instance, the capabilities may be categorized into different levels of experience or expertise that an agent has with respect to the identified subject matter area. By way of example, the agent may be able to indicate that he or she is an "expert", a "specialist", a "generalist", etc., with respect to the identified subject matter area. In another example, the agent may be able to rate his or her own expertise or knowledge with respect to that subject matter area, using an alphanumeric rating scale, or in other ways. Similarly, the agent may be able to enter a textual description, links, or other indications of his or her capabilities with respect to the identified subject matter area. All of these are contemplated herein.

Capability level exposure logic 372 then detects the agent interaction identifying the capability level for the identified subject matter area. This is indicated by block 398.

Capability exposure system 178 is, in one example, configured to allow an agent to enter capabilities for multiple different subject matter areas, either at the same time, or sequentially. Thus, at block 400, system 178 determines whether the agent is to specify any more subject matter areas or to enter any more capability information. If so, processing reverts to block 388.

If, at block 400, it is determined that the agent has finished entering capability information, then capability exposure system 178 can pool this particular agent with any other similar agents, based upon the capability information that was entered. This is indicated by block 402. By way of example, it may be that the various different agents 108-110 are grouped based on similar capabilities. Thus, when a call is received for assistance in a particular subject matter area, an agent from that pool can be selected, based on their availability, based upon their reputation, based upon the capability level, etc. This is described in greater detail below.

Once the agent has been pooled (if that is desired) then the agent data is saved to a capability data store, such as that described below with respect to FIG. 4D, so it can be accessed by matching logic in system 190. Saving the agent data for access by the matching logic in support routing system 190 is indicated by block 404 in FIG. 4B.

Figure 4C:
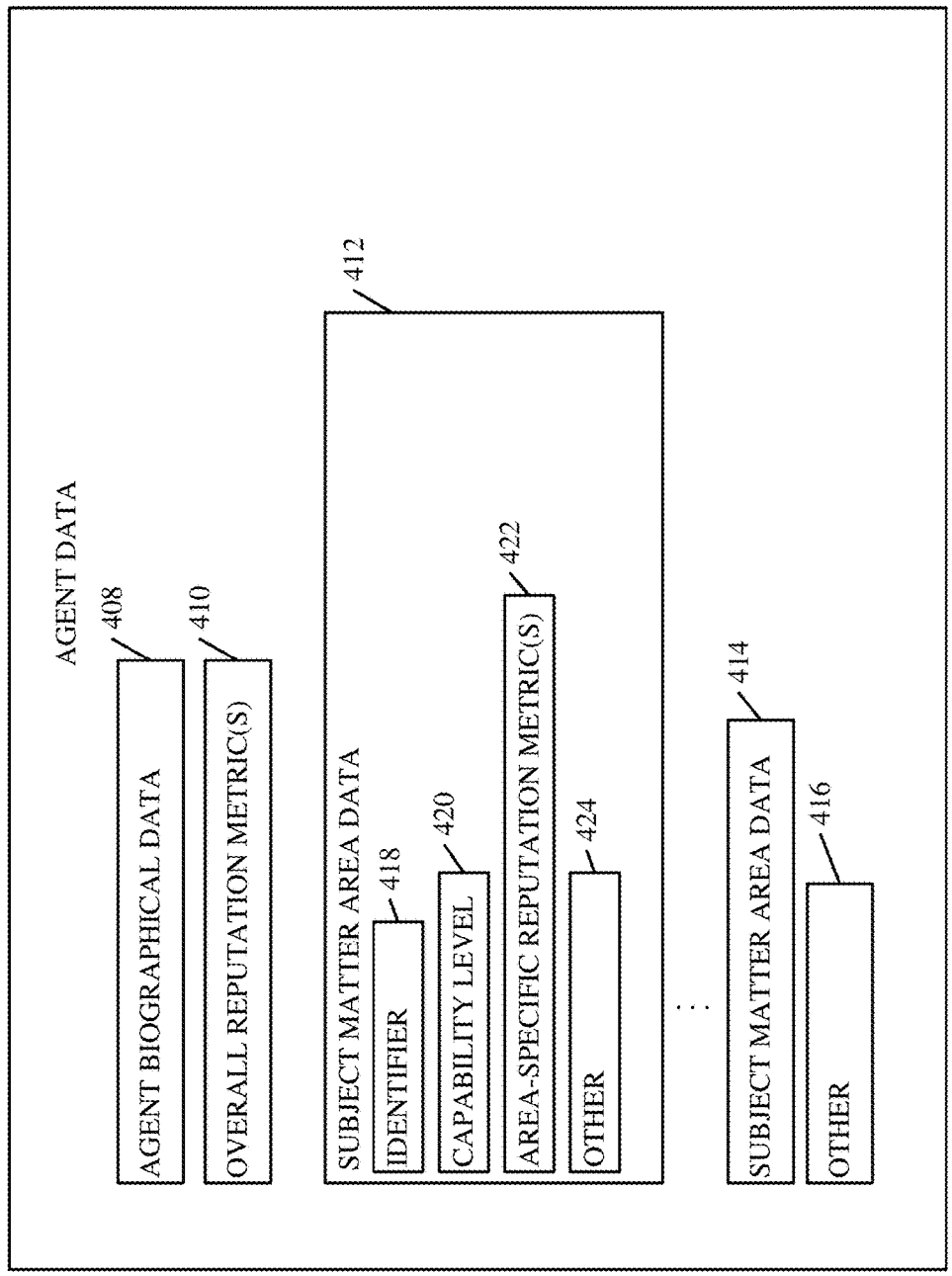
FIG. 4C shows one example of agent data.

FIG. 4C is a block diagram showing one example of agent data 406 that can be generated and exposed by an agent (such as being stored for access by support routing system 190). In one example, agent data 406 includes agent biographical data 408, one or more overall reputation metrics 410 that can be generated (as described in greater detail below) by users who have used this particular agent to resolve problems. Agent data 406 can also include subject matter area data 412-414 for a variety of different subject matter areas. Data 406 can include a wide variety of other information 416 as well.

For each subject matter area, the corresponding data illustratively includes a subject matter area identifier 418, capability level 420, one or more area-specific reputation metrics 422, and it can include other items 424. Identifier 418 illustratively identifies the particular subject matter area that data 412 corresponds to. Capability level 420 illustratively includes the capability level information entered by the corresponding agent, for this subject matter area. Area-specific reputation metrics 422 illustratively identify the reputation of this particular agent (among users) for this particular subject matter area. Agent data 406 can thus be used by support routing system 190 to identify a particular agent that has capabilities and a reputation with respect to a particular subject matter area, so that the agent can be used to help a user resolve an issue in that particular subject matter area. All of this information is described by way of example only.

Figure 4D:
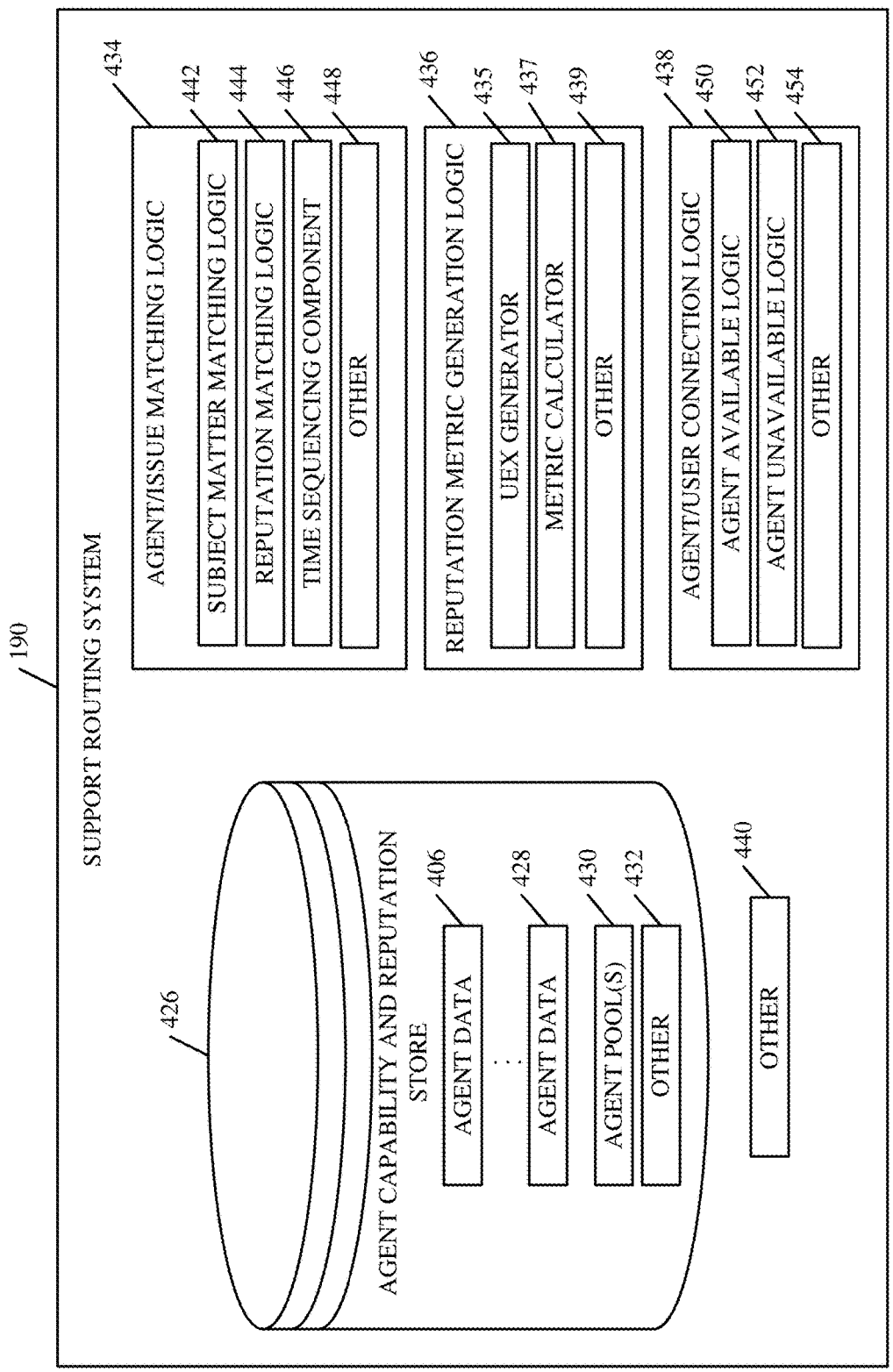
FIG. 4D is a more detailed block diagram of one example of a support routing system.

FIG. 4D is a more detailed block diagram of one example of support routing system 190. In the example shown in FIG. 4D, system 190 illustratively includes agent capability and reputation store 426. It will be noted that store 426 can be located substantially anywhere in the architecture 100, shown in FIG. 1, or in other locations as well. It is shown and described as being part of support routing system 190 for the sake of example only.

Store 426 illustratively includes the agent data 406-428, for various different agents 408-410. It can also include the agent pools 430 described above. Of course, it can include a wide variety of other items 432 as well.

System 190 also illustratively includes agent/issue matching logic 434, reputation metric generation logic 436, agent/user connection logic 438, and it can include a wide variety of other items 440. Agent/issue matching logic 434 illustratively includes subject matter matching logic 442, reputation matching logic 444, time sequencing component 446, and it can include other items 448. Agent/user connection logic 438 illustratively includes agent available logic 450, agent unavailable logic 452, and it can include other items 454. Before describing the operation of system 190 in more detail, a brief description of some of the items in system 190 will first be provided.

Subject matter matching logic 442 illustratively receives the issue identified by problem identification system 188 (and it can receive other information as well), and accesses agent capability and reputation store 426 to identify an agent that can be used to address the identified issue. In doing so, it may first access agent pools 430 to identify a pool of agents that have sufficient capabilities to address the issue. It may then access the individual agent data 406-428 for the agents in that pool to identify a particular agent that may be used to address the issue, based upon the agent's capabilities. Similarly, reputation matching logic 444 may access the agent data 406-428 or the agent pools 430, or both, to identify an agent that has a reputation that indicates that the agent may be reliable in addressing the user's issue. Time sequencing component 446 illustratively keeps track of the time (such as using timestamps) that the customer's issue is received, and the timeliness with which the agent responds to a notification, and responds to the user in addressing the issue.

Agent/user connection logic 438 illustratively connects the user that submitted the issue to the selected support agent. Agent available logic 450 illustratively generates one connection user experience (UEX) if an agent is immediately available to address the user's issue. Agent unavailable logic 452 illustratively generates another user experience (UEX) if an agent is not immediately available. In one example, for instance, logic 450 generates a UEX that allows the user to have instant communication with an agent (such as through a telephone or cellular phone call, such as through instant messaging, etc.). Logic 452, on the other hand, provides for communication using a delayed response, such as using electronic mail (e-mail), or such as generating suitable messages indicating that an agent will contact the user within a suitable time period, given that no agent is currently available to assist the user.

Reputation metric generation logic 436 illustratively generates a user experience that allows a user to provide feedback with respect to the agent. In one example, the feedback can be for a plurality of different service areas (such as competency, timeliness, courtesy, etc.). In another example, an overall reputation metric can be generated as well, which indicates the user's overall satisfaction with this particular agent. All of this is described in greater detail below.

Figure 4E:
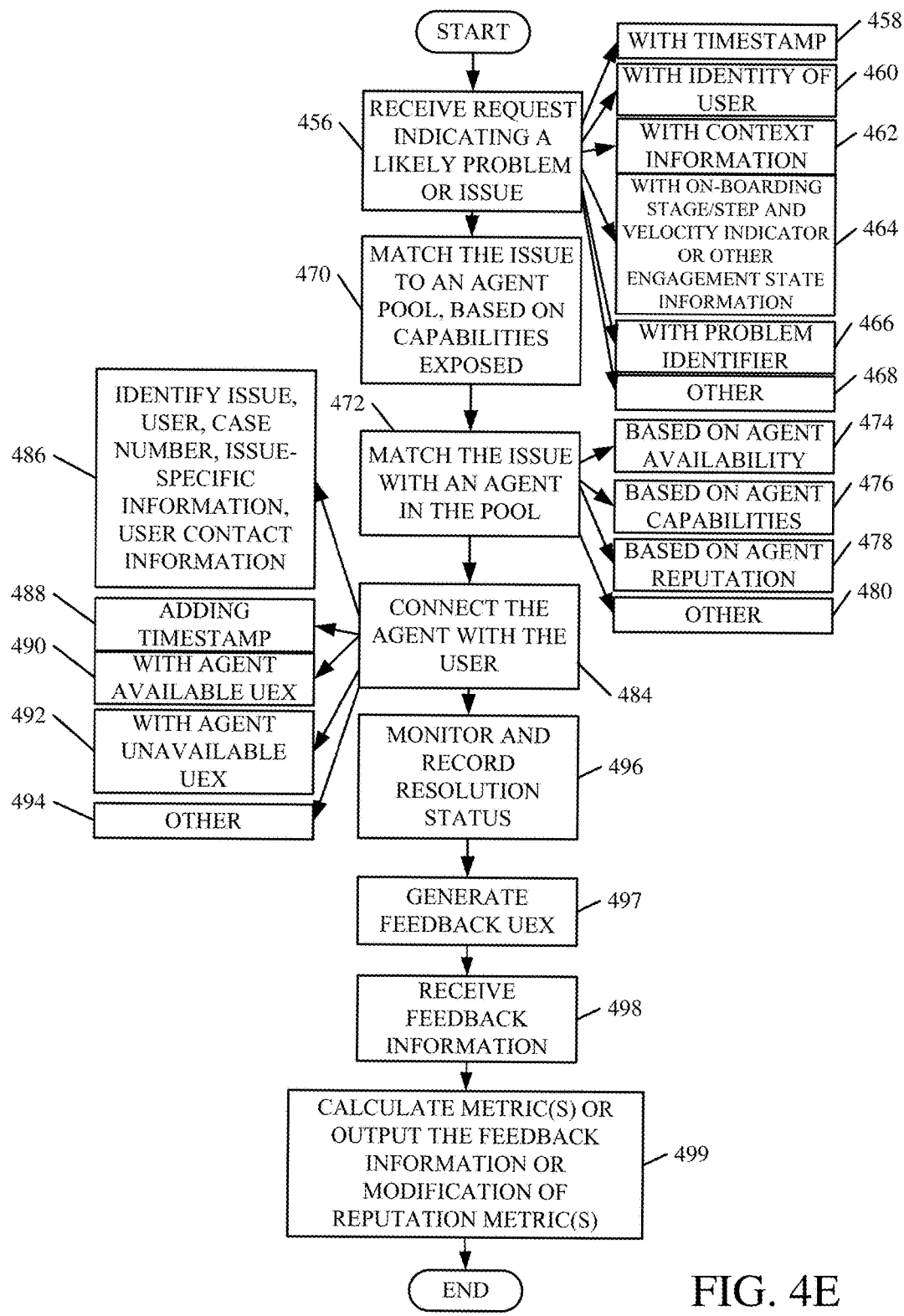
FIG. 4E is a flow diagram showing one example of the operation of the support routing system.

FIG. 4E is a flow diagram illustrating one example of the operation of support routing system 190 in receiving a request indicating that a user has an issue, connecting the user to a particular agent, and handling feedback from the user based upon his or her interaction with the agent.

In doing so, system 190 (or other items in architecture 100) can track a variety of different things. For instance, when a request is generated by a user for support from an agent, agent/user connection logic 438 can track a number of different things. It can generate a timestamp on the request when the user first submits the request (such as by clicking "Help" on a user interface display). It can track the number of times that a request gets put into a queue for response by an agent, and the time that the request spends in each queue. It can track the number of times the request has been accepted by an agent and the number of times it has been declined. It can track the number of times the request has timed out. In addition, it can track other information about individual agents. For instance, it can track the percent of accepted requests in which the agent actually makes contact with the user and the percent of requests for which both the agent and the user confirm resolution. It can also calculate the total lifetime of a request, which may be calculated as the time that the request was resolved minus the time that the request was generated (both times being represented by timestamps).

The system can track aggregate request data as well. This can include, for instance, the success rate of agents in resolving requests, the number of times (or percentage) where the agent confirms that an issue is resolved but the user does not, and the number or percentage of requests that go unresolved (whether by the agent or the user). The average time for resolving a request can be calculated, and the reasons that a request is not resolved may also be obtained and logged.

In addition, the client side engagement sensing logic 166, or context-based routing system 112, or a combination of both of them, can track data from users as well. For instance, the amount of time between a page load that a user is working on, and the time that the user requests help may be tracked. Also, the systems can track the number of times that a user cancels a request and the feedback indicating how happy a user is immediately after the issue is resolved. The wait time (which can be calculated as the time that the system contacts an agent minus the time that the user requested help) can be tracked, and the amount of time any given agent has spent on a request can also be tracked.

Further, the capability exposure system 178, or context-based routing system 112 (or a combination of both of them) can also track additional information about agents. For instance, it can track the total number of requests sent to each individual agent (and whether they were accepted or rejected). It can track the time when an agent is notified about a request and the time between when an agent accepts a request and when the agent contacts a user. It can also track the number or percentage of requests that were sent to a given agent, and accepted by that agent, where the agent does not contact the user. It can also track the number or percent of requests that the agent identifies as resolved. In addition, reputation metric generation logic 436 can also generate reputation scores, or capability information based on the number of specific scoped tasks that a given agent accepts and resolves. All of these items of information are given by way of example only. Some of them will be described in greater detail below.

Referring again to the flow diagram of FIG. 4E, agent/issue matching logic 434 first receives a request indicating a likely problem or issue. This is indicated by block 456 in FIG. 4E. The request can include a timestamp indicating the time when the issue was automatically and proactively detected by problem identification system 188 (e.g., even before receiving a user help request corresponding to the issue) or when the user first indicated that he or she was having an issue. It can include timestamps for other items as well, such as when it was received by agent/issue matching logic 434, or other time periods. This is indicated by block 458. The request can include the identity of the particular user 130-132 which indicated he or she is having a problem. This is indicated by block 460. It can also include the context information generated by engagement context information gathering system 134. This is indicated by block 462. It can include the on-boarding stage/step and velocity indicator and/or other engagement state identified by engagement state identification system 186. This is indicated by block 464. It can include the problem identifier generated by problem identification system 188. This is indicated by block 466. It can include a wide variety of other information as well, as indicated by block 468.

Subject matter matching logic 442 then matches the issue to an agent pool 430, based upon the capabilities exposed by the agents in the various pools 430. This is indicated by block 470. This can take a wide variety of different forms. For instance, it may be that the problem identifier that is received identifies the problem and this corresponds to the subject matter area identifiers 418 in the agent data 406. It may also correspond to a pool identifier that identifies the individual agent pools 430. Matching the issue against a pool of agents that are capable of handling the issue can be done in a wide variety of other ways as well.

Logic 442 then matches the issue with one or more individual agents in the identified pool. This is indicated by block 472. The matching step 472 can be performed by both subject matter matching logic 442 and reputation matching logic 444. In doing so, these components not only take into account the availability 474 of the agents and the capabilities 476 of the agents in the various identified pools (if a pool was identified), but it also accounts for the reputation 478 of those agents. In one example, the reputation metrics can be alphanumeric metrics and a variety of different thresholds can be set. The agents with the reputation metrics that exceed the highest threshold might first be selected (and they can be based on criteria such as their individual capabilities, their availability, the cost of using them, etc.) and then agents that surpass the second highest threshold might be selected, and so on. Of course, this is only one way of matching the issue with a given agent and other ways 480 can be used as well.

Once a particular agent is identified, then agent/user connection logic 438 connects the identified agent with the user. This is indicated by block 484, and it can be done in a wide variety of different ways. In one example, the agent is notified with a notification that includes an issue identifier that identifies the issue, a user identifier that identifies the user, a case number, any issue-specific information, and user contact information. This is indicated by block 486. The notification can also include a timestamp as indicated by block 488.

When the agent is available, then agent available logic 450 generates a user experience that is specific to a currently available agent. This is indicated by block 490. When the agent is unavailable, then agent unavailable logic 452 generates a user experience that is specific to an agent that is not immediately available. This is indicated by block 492. Some aspects of these user experiences are described below with respect to the user interface displays shown in FIGS. 5A-8B. The agent can be connected with the users in other ways as well, and this is indicated by block 494.

Time sequencing component 446 illustratively monitors and records a resolution status for the issue, as the agent and user are interacting with one another. This is indicated by block 496. In doing so, it can apply timestamps to information, indicating when various things occurred (such as how quickly the agent accepted the issue notification and agreed to address the issue with the user, how soon the agent contacted the user, how soon the agent responded to communications by the user, whether the issue was eventually resolved, etc.).

Reputation metric generation logic 436 illustratively includes UEX generator 435 that generates a user experience that allows the user to enter feedback with respect to the agent. Generating the feedback UEX is indicated by block 497.

Metric calculator 437 then receives the feedback information and can either calculate or modify the various reputation metrics or output the feedback information for calculation or modification of the reputation metrics by another system. Receiving the feedback information is indicated by block 498 and calculating the metrics or outputting it for metric calculation is indicated by block 499.

Figure 4F:
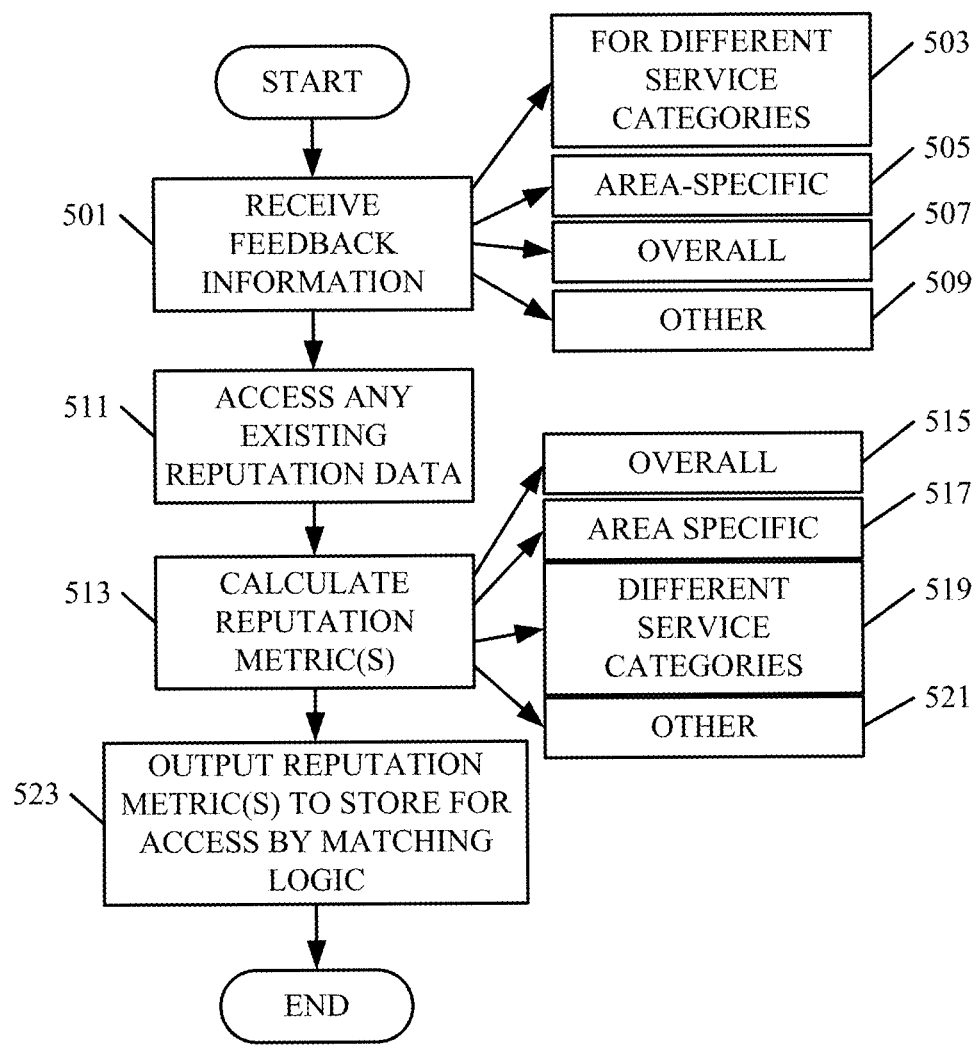
FIG. 4F is a flow diagram showing one example of the operation of reputation metric generation logic.

FIG. 4F is a flow diagram illustrating one example of the operation of metric calculator 437 in calculating one or more reputation metrics for a given agent, based upon feedback information. Calculator 437 first receives the feedback information, as indicated by block 501. The feedback information can be for one or more different service categories (such as competency, courtesy, timeliness, etc.). This is indicated by block 503. It can be area-specific feedback information (such as how the agent performed in resolving an issue in a particular subject matter area). This is indicated by block 505. It can also be overall feedback information indicating the overall satisfaction of a user in using this particular agent. This is indicated by block 507. It can include a wide variety of other feedback information 509 as well.

Metric calculator 437 then accesses any already-existing reputation information (such as an already existing overall reputation metric 410 or any already-existing area-specific reputation metrics 422) for this user. This is indicated by block 511. Calculator 437 then calculates one or more reputation metrics based upon the newly received feedback information. This is indicated by block 513.

For instance, if no already-existing metrics are available for this agent, then it can calculate one or more reputation metrics for this agent, based upon the feedback information from the user. If already-existing reputation metrics exist, then it can recalculate or modify those reputation metrics, based upon the newly received feedback information. The reputation metrics, again, can be an overall reputation metric 515, area-specific metrics 517, they can be for different service categories (such as timeliness, courtesy, competency, etc.) 519, or they can be other reputation metrics 521.

Calculator 437 then outputs the reputation metrics so that they can be stored in agent capability and reputation store 426, for this particular agent. This is indicated by block 523. The new (or updated) reputation metrics can then be accessed by reputation matching logic 444 for matching this particular agent with other users when future issues are identified.

Figure 5A:
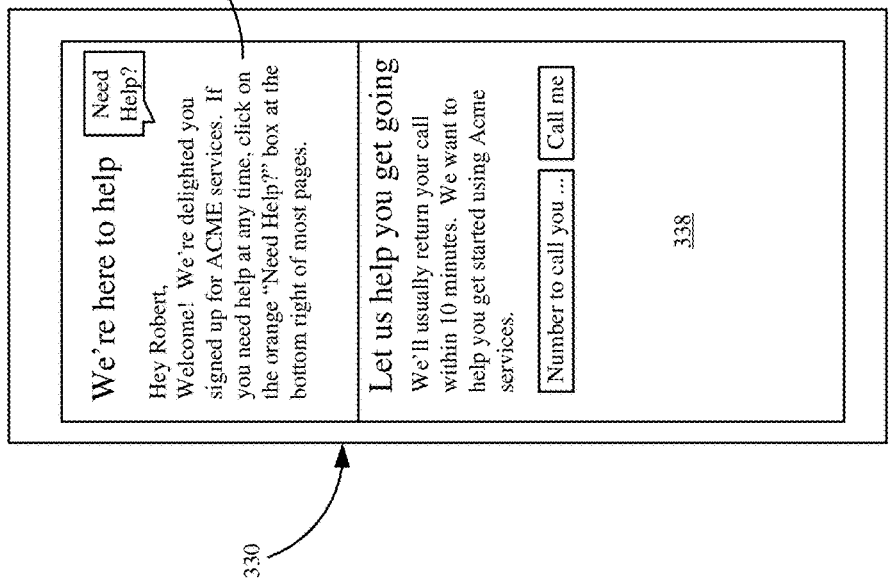
FIGS. 5A and 5B show examples of user interface displays.
Figure 5B:
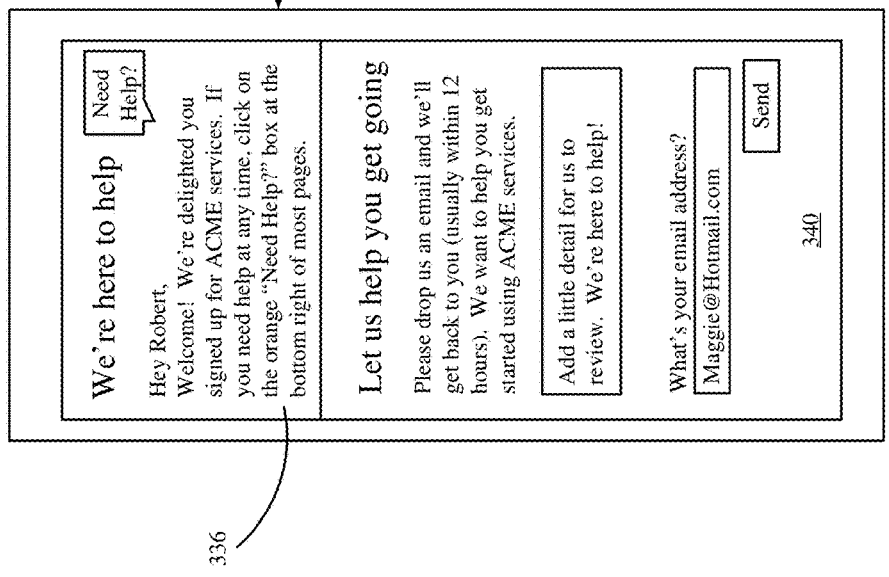

FIGS. 5A and 5B show two examples of user interface displays 330 and 332, respectively, that can be generated by context-based routing system 112 in response to being triggered. FIGS. 5A and 5B are illustratively generated during the onboarding processes when a tenant is attempting to setup or otherwise configure a service. This can be automatically and proactively detected, when the system identifies that the tenant is encountering an issue or it can be detected by the tenant requesting help or based on another user input. The user interface display 330 may be generated by agent available logic 450 when a support agent is available, and user interface display 332 may be generated by agent unavailable logic 452 when a support agent is not currently available. It can be seen that both displays include a greeting portion 334-336. Also, they each include a communication portion 338, 340. The communication portions 338-340 allow the user to enter a telephone number (where an agent is available) or other contact information (where an agent is unavailable). Portion 340 also allows a user to enter descriptive material describing the nature of the problem.

Figure 6A:
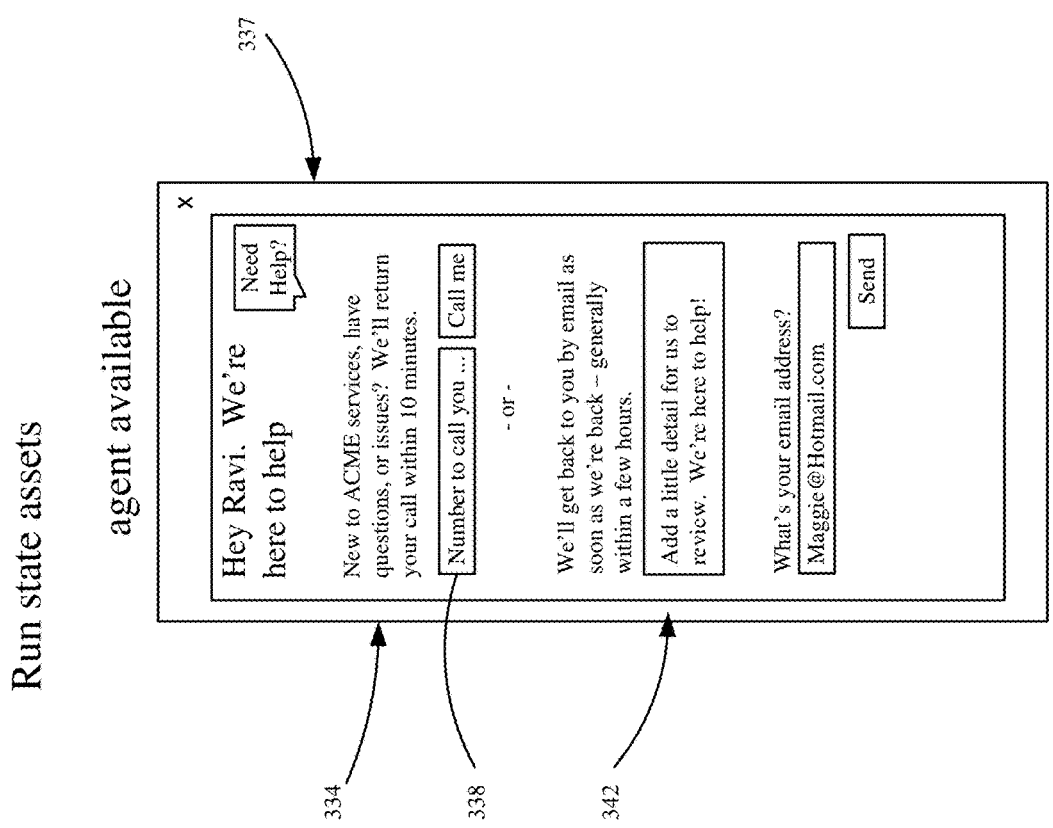
Figure 6B:
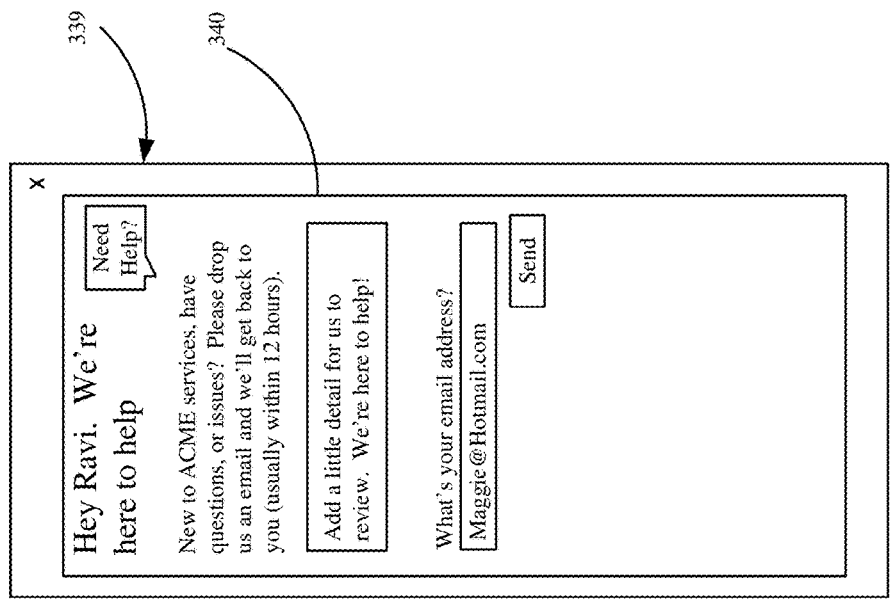

FIGS. 6A and 6B are similar to FIGS. 5A and 5B, and similar items are similarly numbered. FIGS. 6A and 6B may be generated when the tenant is already running the service, but is having a problem or issue with the service. Both FIGS. 6A and 6B include an introductory or salutation portion, 334 and 336, similar to those shown in FIGS. 5A and 5B. FIG. 6A shows one example of a user interface display 337 that may be generated by agent available logic 450 when an agent is available. When an agent is available, the user can enter a telephone number in a text box to receive a call. This is illustrated generally at 338. Alternatively, the user can add detail and a contact address (such as an e-mail address) as indicated generally at block 342. FIG. 6B shows one example of a user interface display 339 that may be generated by agent unavailable logic 452 when an agent is not available. The user can describe the problem and enter contact information, as shown generally at 340.

FIG. 6C shows an example of another user interface display 350. Display 350 can be generated by UEX generator 435 in reputation metric generation logic 436 to provide feedback, after a support agent has helped the user address the problem or issue that the user was dealing with. The display can provide a user input mechanism 352 that allows the user to indicate whether the issue was resolved. A user input mechanism 354 can be provided to allow the user to rate his or her support, and a user input mechanism 356 can be provided to allow the user to rate his or her overall experience. A comments user input mechanism 358 can be provided, as can a set of controls 360, that allow the user to submit the feedback or to answer further questions.

Figure 7A:
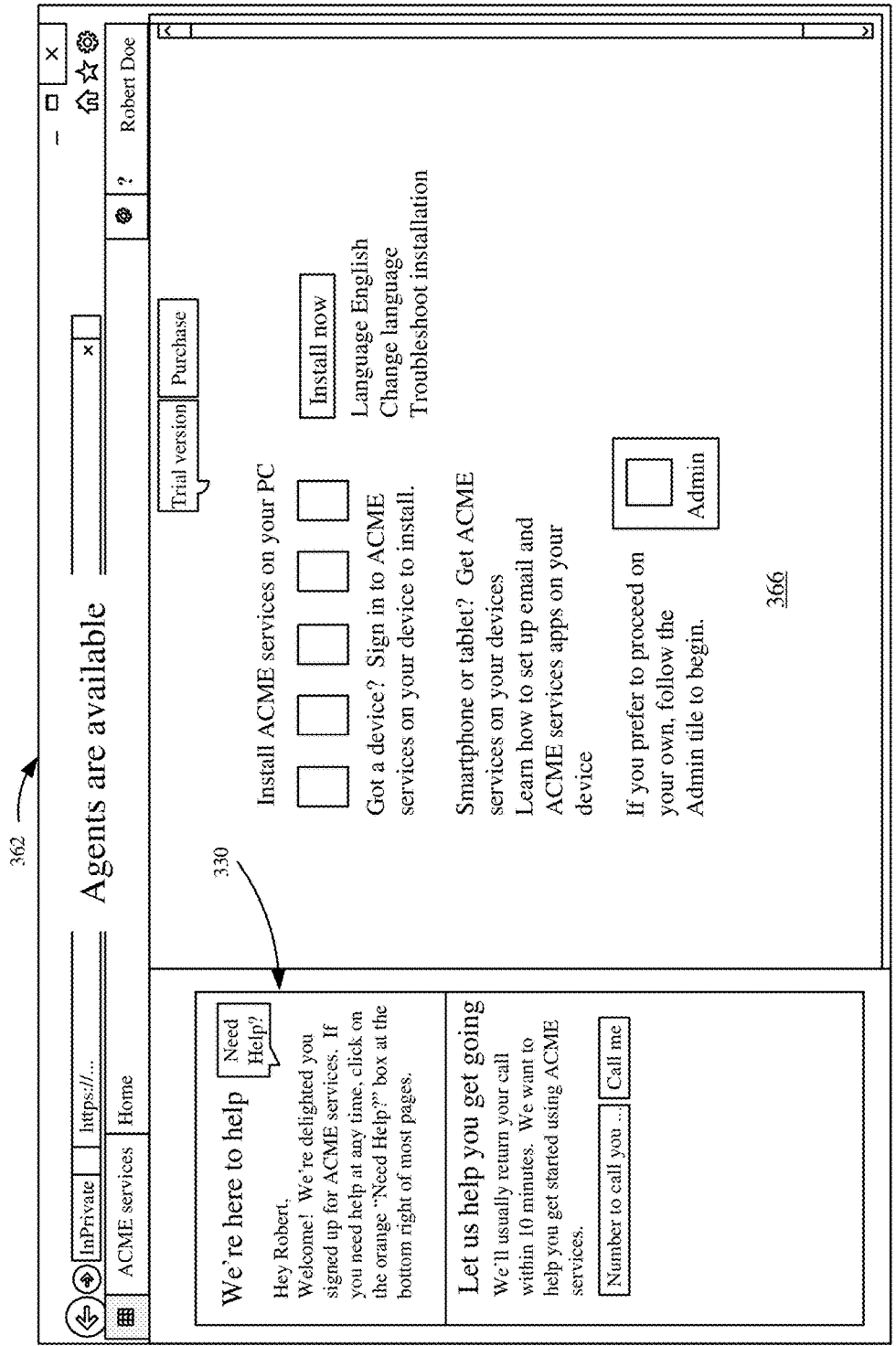
FIGS. 7A-7B show examples of user interface displays.
Figure 7B:
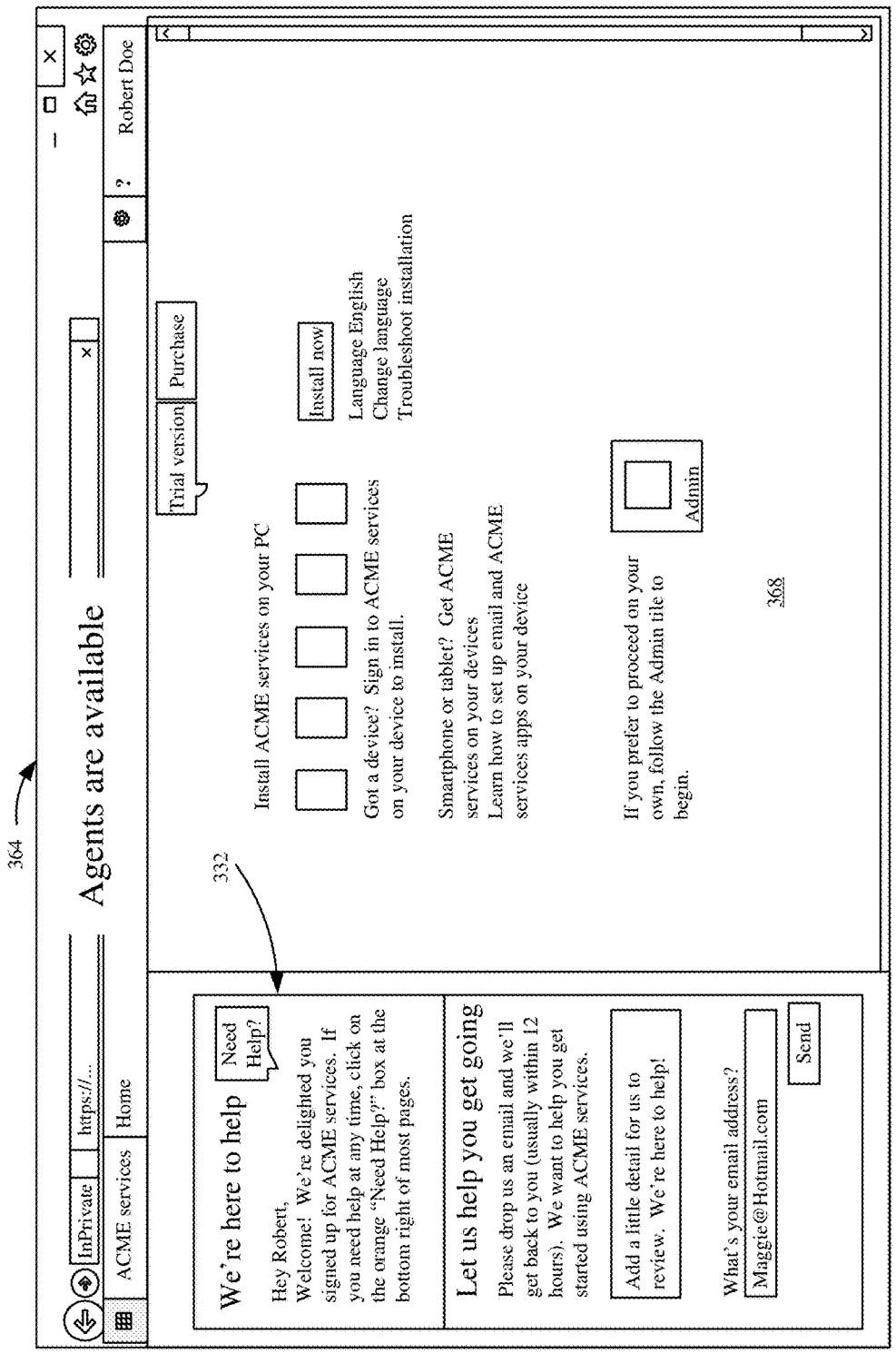

FIGS. 7A and 7B show user interface displays 362 and 364, respectively. They are illustratively user interface displays that can be generated when an issue is automatically detected or when system 112 is otherwise triggered. It can be seen that FIG. 7A includes a first user interface display portion 366 that can be displayed when the user beings running a service. Also, user interface display 330 (described above with respect to FIG. 5A) is shown adjacent display portion 364.

FIG. 7B is similar to that in FIG. 7A, and similar items are similarly numbered. Therefore, display 364 includes display portion 368 that can be generated when the user begins running a service. Also, if a support agent is unavailable, user interface display 332 (described above with respect to FIG. 5B) can be displayed instead of user interface display 330, (as shown in FIG. 7A).

Figure 8A:
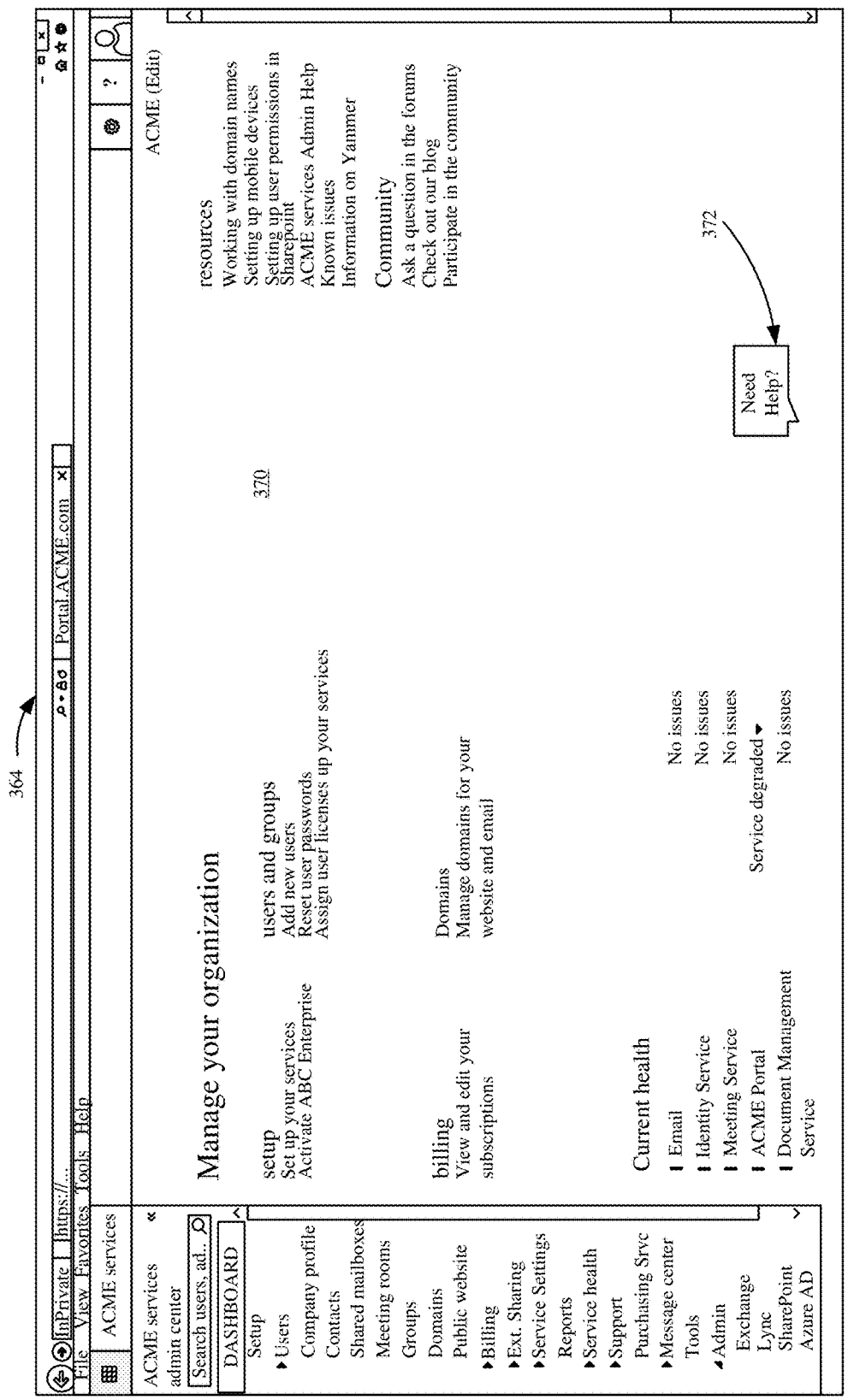
FIGS. 8A-8B show examples of user interface displays.
Figure 8B:
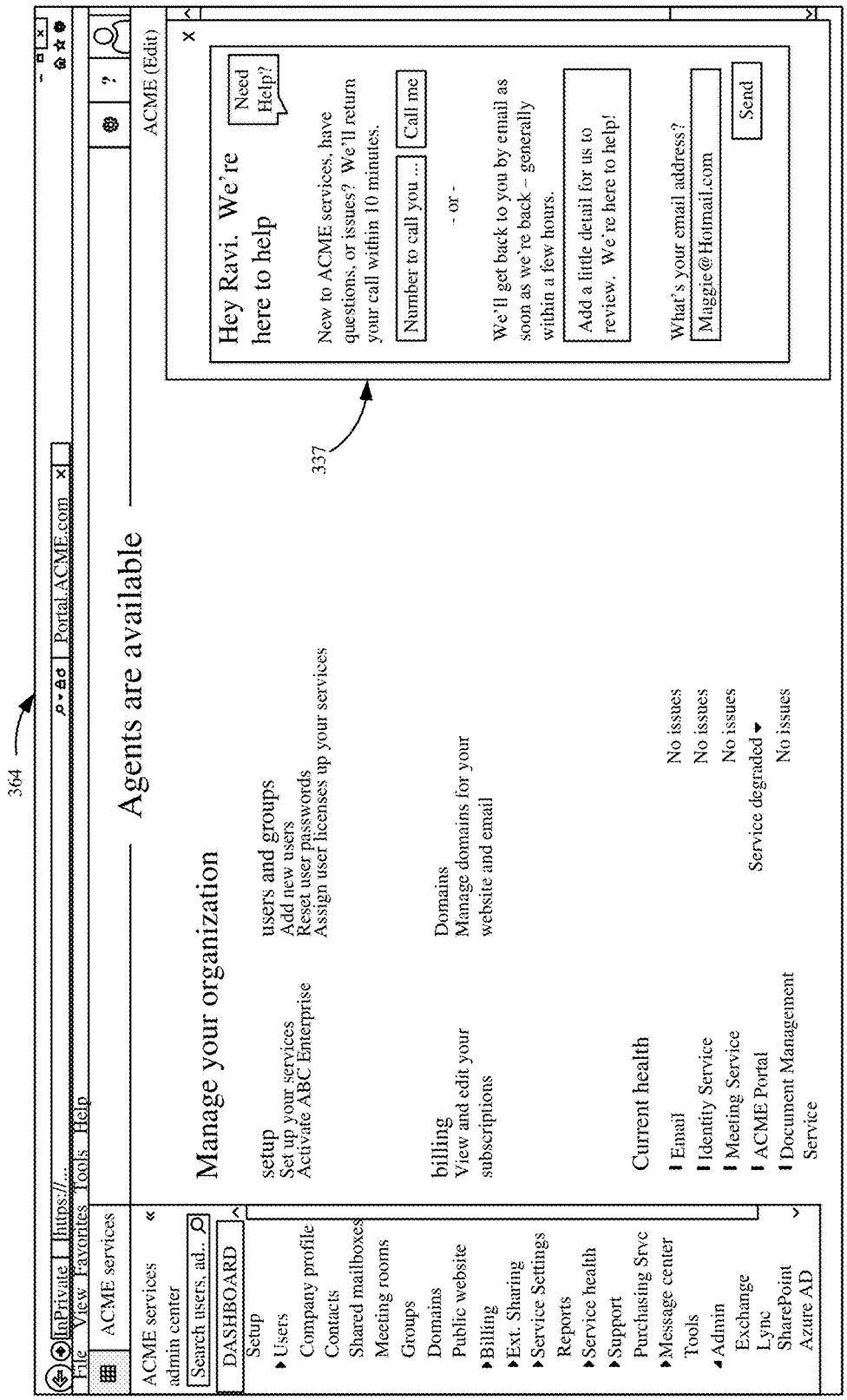

FIGS. 8A and 8B show how displays can be generated, when the user actuates a help user input mechanism to affirmatively request help. For instance, FIG. 8A shows a user interface display 370 that can be generated for an administrative user who is attempting to organize a tenant service. A help user input mechanism 372 is generated, and may be displayed on every page, slightly above the lower bound of the page, or elsewhere. When the user actuates user input mechanism 372, a help display can be generated, such as display 337, which was described in greater detail above with respect to FIG. 6A, or any other suitable display.

It can also be seen that a variety of different kinds of content information can automatically be obtained, and an engagement state of a user or tenant can be identified. This enhances the operation of the system as very little bandwidth is needed to communicate with a tenant to identify any problems or the engagement state of the tenant. This improves the speed and accuracy of the system and reduces network traffic and UI rendering overhead and processing.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Further, the term "automatically" has been used relative to performing one or more actions. In one example, this means that the one or more actions are performed without further user input, except perhaps to initiate or authorize the one or more actions.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures.

Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
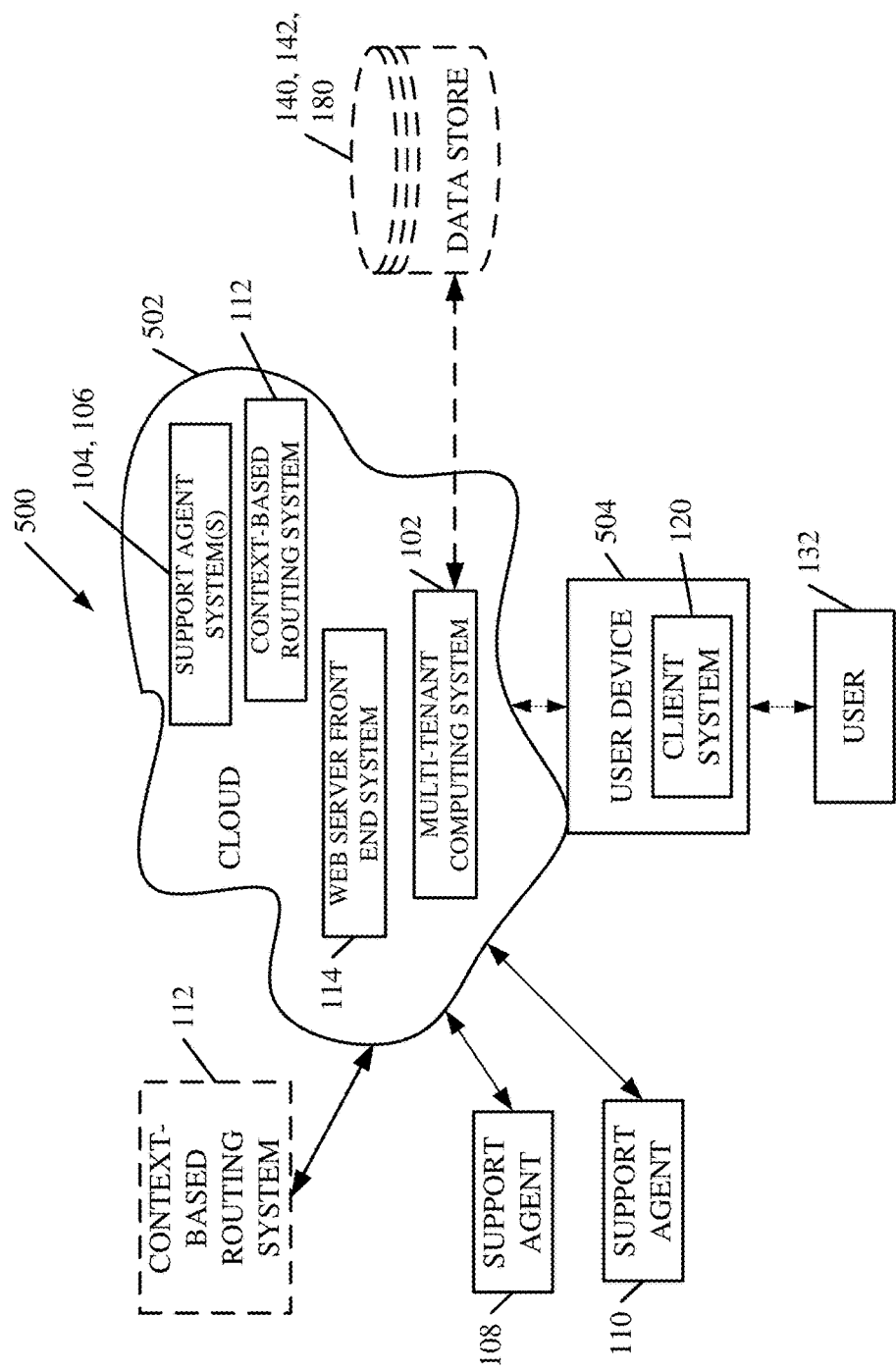
FIG. 9 shows one example of the architecture disposed in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that systems 102, 104, 112 and 114 can be located in cloud 502 (which can be public, private, or a combination where portions are public while others are private). Therefore, users 130-136 cam use user device (with client systems) 504 to access those systems through cloud 502.

FIG. 9 also depicts another example of a cloud architecture. FIG. 9 shows that it is also contemplated that some elements of architecture 100 can be disposed in cloud 502 while others are not. By way of example, data stores 140, 142, 180 can be disposed outside of cloud 502, and accessed through cloud 502. In another example, context-based routing system 112 is also outside of cloud 502. Regardless of where they are located, they can be accessed directly by devices 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
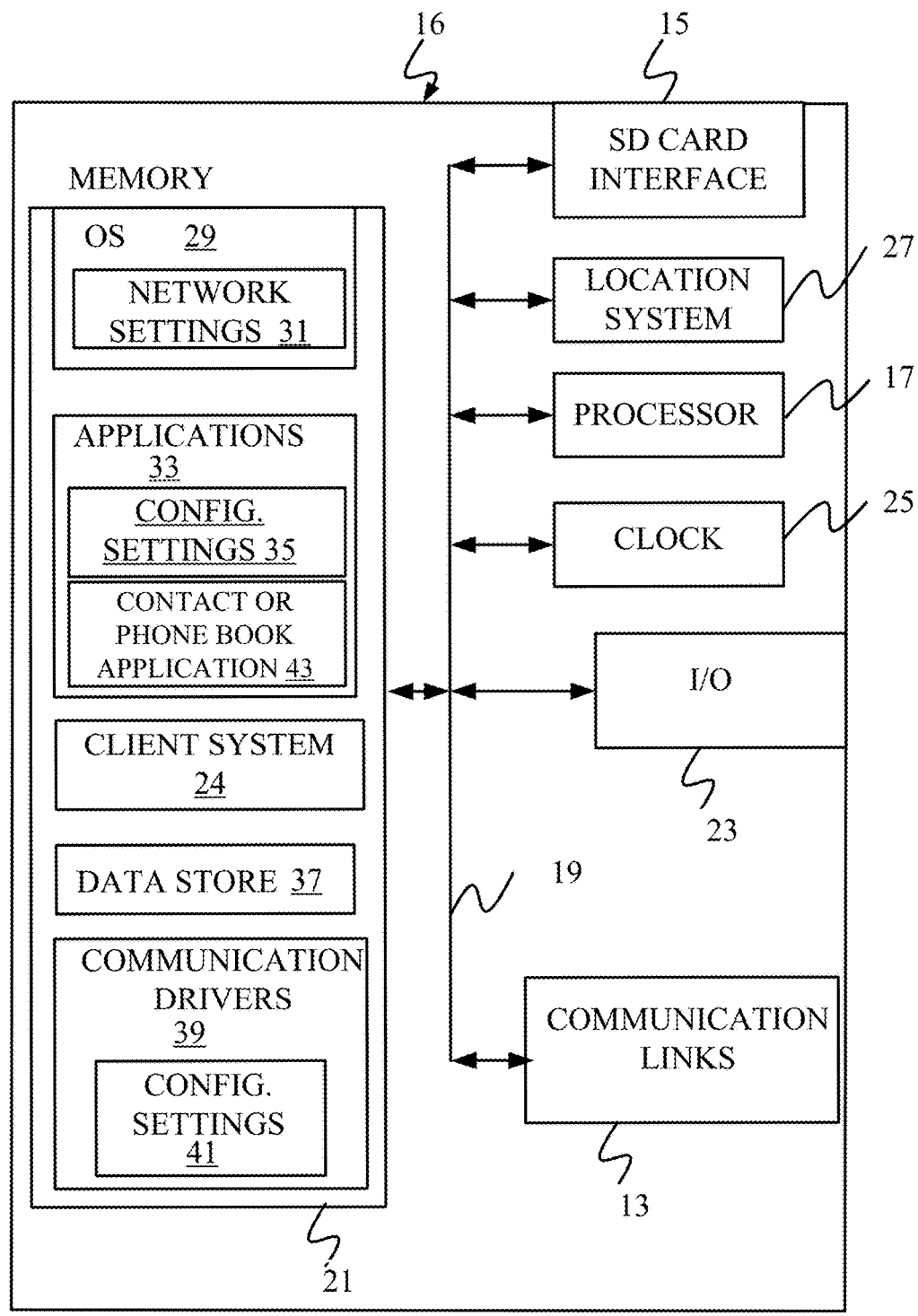
FIGS. 10-12 show examples of mobile devices that can be used in the architectures of the previous figures.
Figure 11:
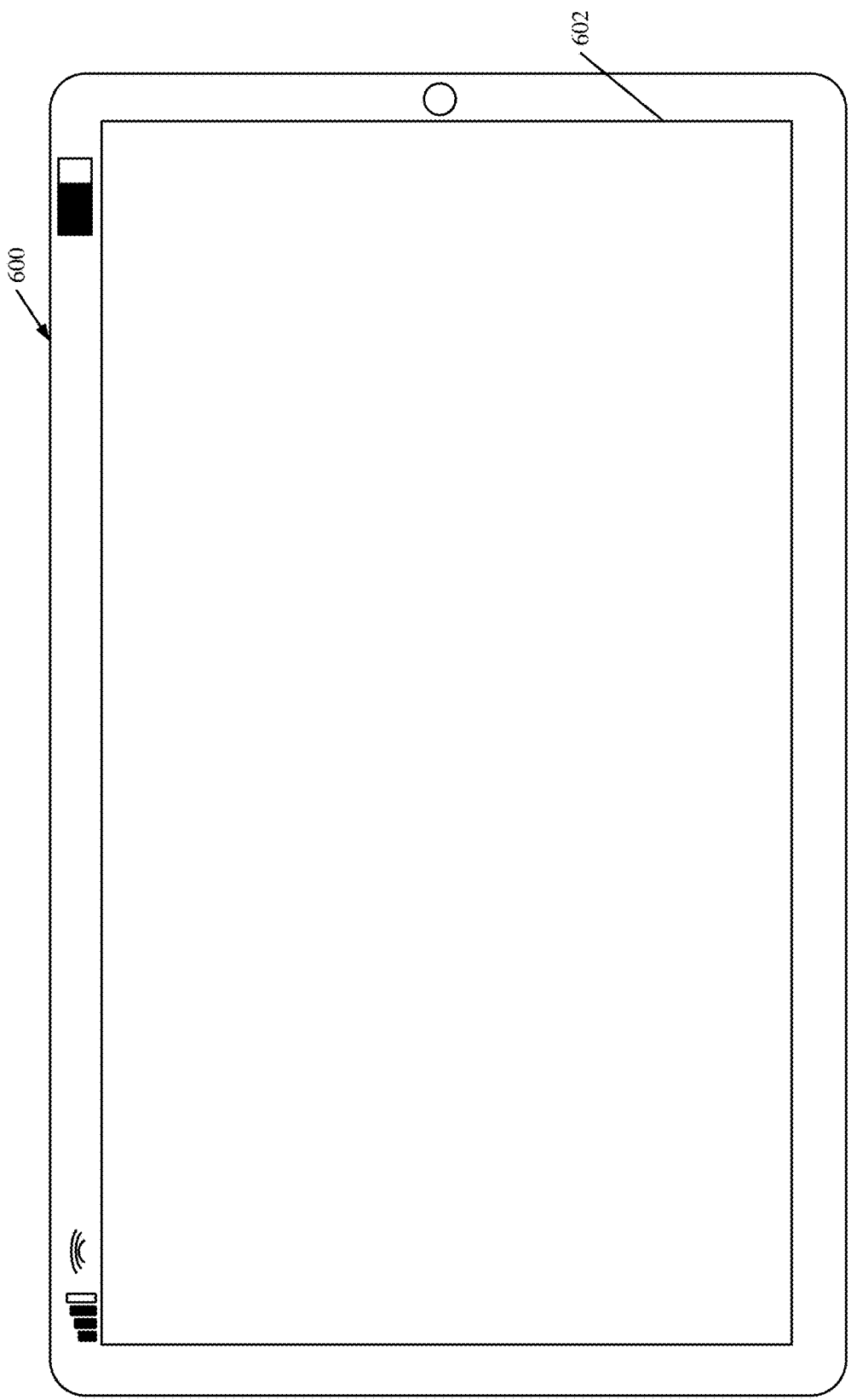
Figure 12:
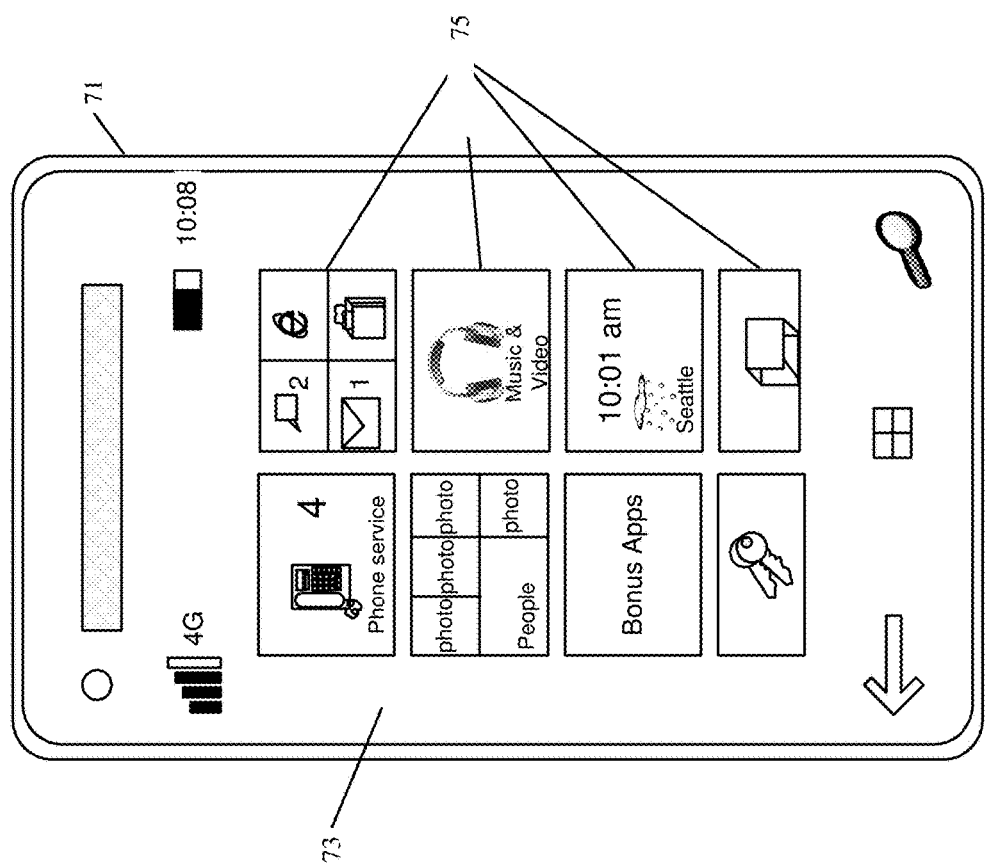
Figure 13:
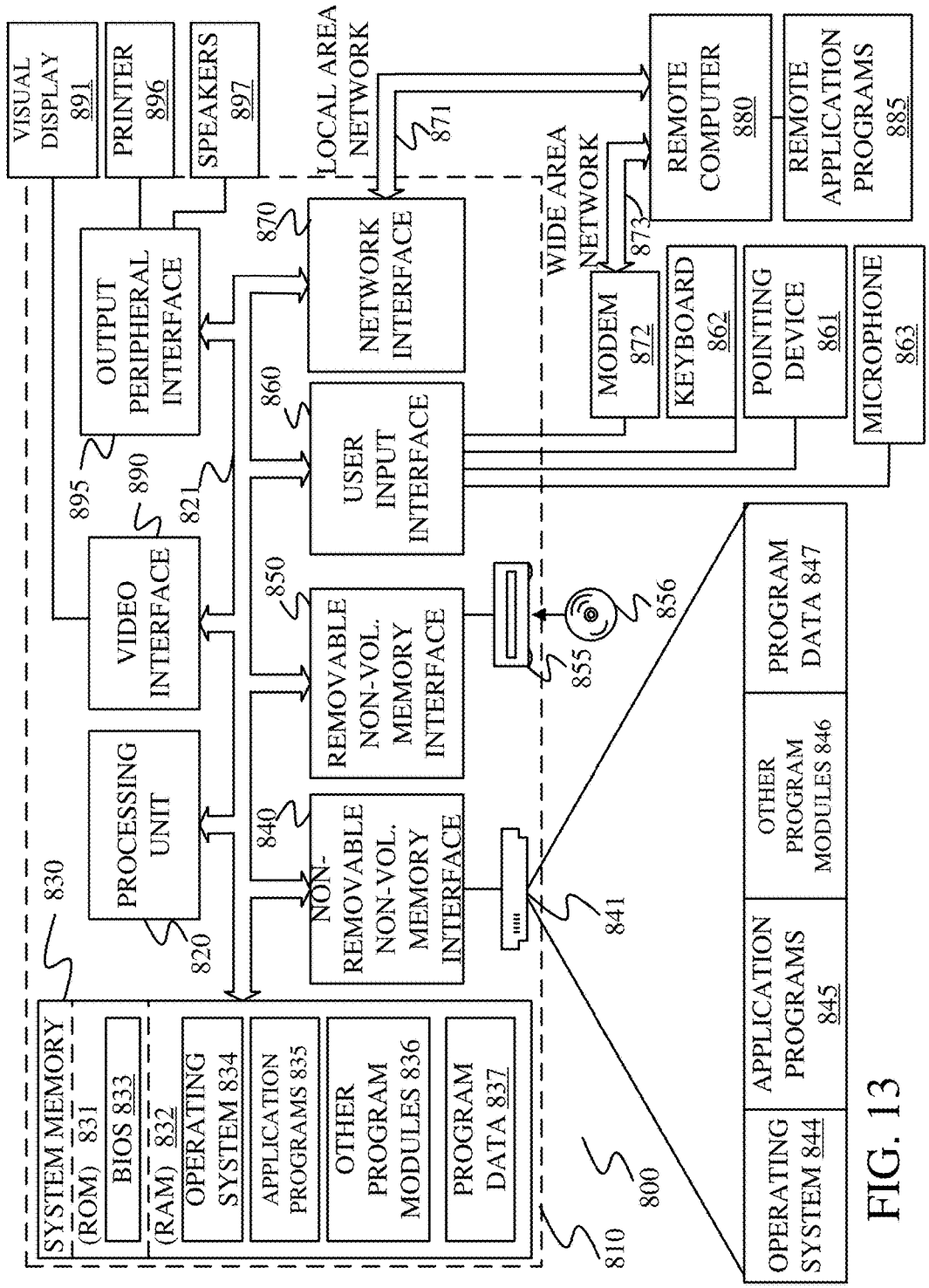
FIG. 13 is a block diagram of one example of a computing environment that can be used in the architectures of the previous figures.

FIG. 10 is a simplified block diagram of one illustrative example of a handheld or mobile computing device that can be used as a user's or client's hand held device 16, in which the present system (or parts of it) can be deployed. FIGS. 11-13 are examples of handheld or mobile devices.

FIG. 10 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers or virtual machines from the previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processor or servers or virtual machines from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an on-boarding step identifier that automatically identifies a step, of a plurality of steps, that a user has completed in a predefined on-boarding process that is used by a user to set up and configure an on-line service, the on-boarding step identifier generating a step identifier indicative of the identified step;

velocity detection logic that detects a velocity with which the user is completing the steps in the on-boarding process and generates a velocity indicator indicative of the detected velocity; and a routing system that identifies an on-boarding issue based on the step identifier and the velocity indicator, identifies a support agent based on the on-boarding issue identified, and sends a notification to notify the support agent of the on-boarding issue identified.

Example 2 is the computing system of any or all previous examples wherein the routing system comprises:

a problem identification system that accesses a set of context-to-problem mappings based on the step identifier and the velocity indicator to identify the on-boarding issue.

Example 3 is the computing system of any or all previous examples and further comprising:

idle time detection logic that detects an idle time for which the user is idle on a given user interface display generated during the on-boarding process and generates a UI indicator indicative of the given user interface display and an idle time indicator indicative of the detected idle time.

Example 4 is the computing system of any or all previous examples wherein the given user interface display corresponds to a step in the on-boarding process and wherein the on-boarding step identifier identifies the step based on the UI indicator.

Example 5 is the computing system of any or all previous examples wherein the routing system further comprises:

agent/user connection logic that generates user interface information indicative of a user interface display generated for the user, indicating that the support agent has been notified, and providing a user input mechanism that is actuatable to contact the agent.

Example 6 is the computing system of any or all previous examples wherein the problem identification system comprises:

an analysis system that receives the step identifier and the velocity indicator and determines whether the velocity indicator and the step identifier indicate that the user is taking more than a threshold time to complete a step of the on-boarding process and identifies the on-boarding issue based, at least in part, on the determination.

Example 7 is the computing system of any or all previous examples wherein the problem identification system comprises:

an analysis system that receives the step identifier and the velocity indicator and determines whether the velocity indicator and the step identifier indicate that the user is taking more than a threshold time to complete the plurality of steps in the on-boarding process and identifies the on-boarding issue based, at least in part, on the determination.

Example 8 is the computing system of any or all previous examples wherein the agent/user connection logic generates the user interface information proactively, before receiving a user help request corresponding to the on-boarding issue.

Example 9 is the computing system of any or all previous examples wherein the agent/user connection logic generates the user interface information in response to receiving a user help request corresponding to the on-boarding issue.

Example 10 is the computing system of any or all previous examples wherein the routing system comprises:

agent/issue matching logic that accesses agent capability information indicative of agent capabilities for a plurality of different support agents and matches the identified on-boarding issue against the agent capabilities in the agent capability information to identify the support agent.

Example 11 is a computer implemented method, comprising:

automatically identifying a step, of a plurality of steps, that a user has completed in a predefined on-boarding process that is used by a user to set up and configure an on-line service;

generating a step identifier indicative of the identified step;

detecting a velocity with which the user is completing the steps in the on-boarding process;

generating a velocity indicator indicative of the detected velocity;

identifying an on-boarding issue based on the step identifier and the velocity indicator;

identifying a support agent based on the on-boarding issue identified; and sending a notification to notify the support agent of the on-boarding issue identified.

Example 12 is the computer implemented method of any or all previous examples wherein identifying an on-boarding issue comprises:

accessing a set of context-to-problem mappings based on the step identifier and the velocity indicator to identify the on-boarding issue.

Example 13 is the computer implemented method of any or all previous examples and further comprising:

detecting an idle time for which the user is idle on a given user interface display generated during the on-boarding process; and generating a UI indicator indicative of the given user interface display and an idle time indicator indicative of the detected idle time.

Example 14 is the computer implemented method of any or all previous examples wherein the given user interface display corresponds to a step in the on-boarding process and wherein automatically identifying a step in the on-boarding process comprises:

identifying the step based on the UI indicator.

Example 15 is the computer implemented method of any or all previous examples and further comprising:

generating user interface information indicative of a user interface display generated for the user, indicating that the support agent has been notified; and providing a user input mechanism that is user actuatable to contact the agent.

Example 16 is the computer implemented method of any or all previous examples wherein identifying the on-boarding issue comprises:

receiving the step identifier sand the velocity indicator;

determining whether the velocity indicator and the step identifier indicate that the user is taking more than a threshold time to complete one or more steps of the on-boarding process; and identifying the on-boarding issue based, at least in part, on the determination.

Example 17 is the computer implemented method of any or all previous examples wherein generating the user interface information comprises:

generating the user interface information automatically, before receiving a user help request corresponding to the on-boarding issue.

Example 18 is the computer implemented method of any or all previous examples wherein generating the user interface information comprises:

generating the user interface information in response to receiving a user help request corresponding to the on-boarding issue.

Example 19 is a computing system, comprising:

an on-boarding step identifier that automatically identifies a step, of a plurality of steps, that a user has completed in a predefined on-boarding process that is used by a user to set up and configure an on-line service, the on-boarding step identifier generating a step identifier indicative of the identified step;

velocity detection logic that detects a velocity with which the user is completing the steps in the on-boarding process and generates a velocity indicator indicative of the detected velocity;

a problem identification system that accesses a set of context-to-problem mappings based on the step identifier and the velocity indicator to identify an on-boarding issue; and a routing system that identifies a support agent based on the on-boarding issue identified, and sends a notification to notify the support agent of the on-boarding issue identified.

Example 20 is the computing system of any or all previous examples wherein the problem identification system comprises:

an analysis system that receives the step identifier and the velocity indicator and determines whether the velocity indicator and the step identifier indicate that the user is taking more than a threshold time to complete one or more steps in the on-boarding process and identifies the on-boarding issue based, at least in part, on the determination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    an on-boarding step identifier that automatically identifies a step, of a plurality of steps, that a user has completed in a predefined on-boarding process that is used by a user to set up and configure an on-line service, the on-boarding step identifier generating a step identifier indicative of the identified step;
    velocity detection logic that detects a velocity with which the user is completing the steps in the on-boarding process and generates a velocity indicator indicative of the detected velocity; and
    a routing system that identifies an on-boarding issue based on the step identifier and the velocity indicator, identifies a support agent based on the on-boarding issue identified, and sends a notification to notify the support agent of the on-boarding issue identified.

2. The computing system of claim 1 wherein the routing system comprises:
    a problem identification system that accesses a set of context-to-problem mappings based on the step identifier and the velocity indicator to identify the on-boarding issue.

3. The computing system of claim 2 and further comprising:
    idle time detection logic that detects an idle time for which the user is idle on a given user interface display generated during the on-boarding process and generates a UI indicator indicative of the given user interface display and an idle time indicator indicative of the detected idle time.

4. The computing system of claim 3 wherein the given user interface display corresponds to a step in the on-boarding process and wherein the on-boarding step identifier identifies the step based on the UI indicator.

5. The computing system of claim 4 wherein the routing system further comprises:
    agent/user connection logic that generates user interface information indicative of a user interface display generated for the user, indicating that the support agent has been notified, and providing a user input mechanism that is actuatable to contact the agent.

6. The computing system of claim 5 wherein the problem identification system comprises:
    an analysis system that receives the step identifier and the velocity indicator and determines whether the velocity indicator and the step identifier indicate that the user is taking more than a threshold time to complete a step of the on-boarding process and identifies the on-boarding issue based, at least in part, on the determination.

7. The computing system of claim 5 wherein the problem identification system comprises:
    an analysis system that receives the step identifier and the velocity indicator and determines whether the velocity indicator and the step identifier indicate that the user is taking more than a threshold time to complete the plurality of steps in the on-boarding process and identifies the on-boarding issue based, at least in part, on the determination.

8. The computing system of claim 5 wherein the agent/user connection logic generates the user interface information proactively, before receiving a user help request corresponding to the on-boarding issue.

9. The computing system of claim 5 wherein the agent/user connection logic generates the user interface information in response to receiving a user help request corresponding to the on-boarding issue.

10. The computing system of claim 1 wherein the routing system comprises:
    agent/issue matching logic that accesses agent capability information indicative of agent capabilities for a plurality of different support agents and matches the identified on-boarding issue against the agent capabilities in the agent capability information to identify the support agent.

11. A computer implemented method, comprising:
    automatically identifying a step, of a plurality of steps, that a user has completed in a predefined on-boarding process that is used by a user to set up and configure an on-line service;
    generating a step identifier indicative of the identified step;
    detecting a velocity with which the user is completing the steps in the on-boarding process;
    generating a velocity indicator indicative of the detected velocity;
    identifying an on-boarding issue based on the step identifier and the velocity indicator;
    identifying a support agent based on the on-boarding issue identified; and
    sending a notification to notify the support agent of the on-boarding issue identified.

12. The computer implemented method of claim 11 wherein identifying an on-boarding issue comprises:
    accessing a set of context-to-problem mappings based on the step identifier and the velocity indicator to identify the on-boarding issue.

13. The computer implemented method of claim 12 and further comprising:
    detecting an idle time for which the user is idle on a given user interface display generated during the on-boarding process; and
    generating a UI indicator indicative of the given user interface display and an idle time indicator indicative of the detected idle time.

14. The computer implemented method of claim 13 wherein the given user interface display corresponds to a step in the on-boarding process and wherein automatically identifying a step in the on-boarding process comprises:
    identifying the step based on the UI indicator.

15. The computer implemented method of claim 14 and further comprising:
    generating user interface information indicative of a user interface display generated for the user, indicating that the support agent has been notified; and
    providing a user input mechanism that is user actuatable to contact the agent.

16. The computer implemented method of claim 15 wherein identifying the on-boarding issue comprises:
    receiving the step identifier sand the velocity indicator;
    determining whether the velocity indicator and the step identifier indicate that the user is taking more than a threshold time to complete one or more steps of the on-boarding process; and
    identifying the on-boarding issue based, at least in part, on the determination.

17. The computer implemented method of claim 15 wherein generating the user interface information comprises:
    generating the user interface information automatically, before receiving a user help request corresponding to the on-boarding issue.

18. The computer implemented method of claim 15 wherein generating the user interface information comprises:

generating the user interface information in response to receiving a user help request corresponding to the on-boarding issue.

19. A computing system, comprising:

an on-boarding step identifier that automatically identifies a step, of a plurality of steps, that a user has completed in a predefined on-boarding process that is used by a user to set up and configure an on-line service, the on-boarding step identifier generating a step identifier indicative of the identified step;

velocity detection logic that detects a velocity with which the user is completing the steps in the on-boarding process and generates a velocity indicator indicative of the detected velocity;

a problem identification system that accesses a set of context-to-problem mappings based on the step identifier and the velocity indicator to identify an on-boarding issue; and a routing system that identifies a support agent based on the on-boarding issue identified, and sends a notification to notify the support agent of the on-boarding issue identified.

20. The computing system of claim 19 wherein the problem identification system comprises:

an analysis system that receives the step identifier and the velocity indicator and determines whether the velocity indicator and the step identifier indicate that the user is taking more than a threshold time to complete one or more steps in the on-boarding process and identifies the on-boarding issue based, at least in part, on the determination.

* * * * *